US009082266B2

(12) United States Patent
Nakamura

(10) Patent No.: US 9,082,266 B2
(45) **Date of Patent: *Jul. 14, 2015**

(54) GAMING MACHINE

(71) Applicant: KONAMI GAMING, INC., Las Vegas, NV (US)

(72) Inventor: Daisuke Nakamura, Las Vegas, NV (US)

(73) Assignee: KONAMI GAMING, INCORPORATED, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/197,828

(22) Filed: Mar. 5, 2014

(65) Prior Publication Data

US 2014/0187310 A1 Jul. 3, 2014

Related U.S. Application Data

(63) Continuation of application No. 13/036,570, filed on Feb. 28, 2011, now Pat. No. 8,708,810.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/34*** | (2006.01) |
| ***G07F 17/32*** | (2006.01) |

(52) U.S. Cl.

CPC ............ *G07F 17/34* (2013.01); *G07F 17/3244* (2013.01)

(58) Field of Classification Search

USPC .............................. 463/20, 21, 22, 23, 25, 27

See application file for complete search history.

(56) References Cited

U.S. PATENT DOCUMENTS

| | | | |
|---|---|---|---|
| 7,744,457 | B2 | 6/2010 | Gauselmann |
| 2004/0266520 | A1 | 12/2004 | Aida |
| 2009/0215519 | A1 | 8/2009 | Yoshizawa |
| 2010/0304829 | A1 | 12/2010 | Yamauchi |

OTHER PUBLICATIONS

Office Action of the corresponding Australian Application No. 2011201615 mailed May 30, 2012.

*Primary Examiner* — Adetokunbo O Torimiro

(74) *Attorney, Agent, or Firm* — Leason Ellis LLP.

(57) ABSTRACT

A gaming machine has a symbol display region composed of cell columns, where cells are continuously disposed in each cell column. Symbols are displayed on each cell column in such a manner that one or more symbols correspond to one of the cells. The gaming machine comprises: a symbol movement control unit that makes each symbol column move along each cell column where a symbol is changed in turn according to an alignment order of the symbols, and makes each symbol column stop; a prize winning determination unit; and a dividend generation unit. The symbol movement control unit comprises: a symbol check unit that determines whether a symbol reaching a filtering position is a specific symbol; and a specific symbol control unit that generates a specific change different from a change to be generated according to the alignment order when the specific symbol reaches the filtering position.

17 Claims, 23 Drawing Sheets

GAMING MACHINE

CROSS REFERENCE TO RELATED APPLICATION

This application is a Continuation of U.S. patent application Ser. No. 13/036,570 filed Feb. 28, 2011, which is incorporated herein by reference in its entirety.

FIELD OF THE INVENTION

The present invention relates to a gaming machine, such as a slot machine, that moves a plurality of symbol columns along columns of cells which are set as symbol stop positions, and determines whether or not a combination of symbols, which appear in a predetermined cell group when the symbol columns are stopped, forms a predetermined prize winning pattern.

BACKGROUND OF THE INVENTION

In a conventionally known slot machine, a symbol display region in which a plurality of cells are arranged in longitudinal and lateral directions is provided on a front surface of a casing, and a physical or virtual reel is disposed with respect to each of cells or each of cell columns arranged in a predetermined direction. On the reel, plural kinds of symbols, each of which represents a numeral, a drawing pattern or the like, are arranged in predetermined alignment order, and thus each of the reels serves as a symbol column. A game is started when a player deposits coins or alternative coins such as medals, tokens, or the like, performs betting operation, and further instructs a game start. In connection with the game start, the reels start to spin along the cell columns. If a predetermined stop time comes, the reels are stopped in such a manner that one symbol appears on each cell or in a manner that symbols appear together on one cell. When a combination of symbols which are stopped on cells in a predetermined cell group satisfies a predetermined prize winning condition, for example, a prize winning pattern made up of the same symbols on a predetermined prize winning determination target line is formed, a dividend according to the prize winning pattern is provided to the player.

In the above described type of slot machine, dividend rates are differentiated from each other according to kinds of symbols. When a specific symbol appears, probability of forming a prize winning pattern may be increased, or a relatively high dividend may be generated. Such symbol is recognized by a player as a symbol that is advantageous for obtaining a dividend. If such symbol appears, it can raise a player's expectation for obtaining the dividend. Accordingly, in order to raise the player's expectation for obtaining a high dividend, there is proposed a gaming machine in which a symbol with advantage for obtaining dividends remains as a fixed symbol in a symbol display region when such symbol appears and stops on a cell at one game opportunity, and, at the next game opportunity, symbols are changed in portions other than the fixed symbol (for example, refer to Patent Document 1).

[Patent Document 1] US2009/0215519A1

Technical Problem

In the conventional gaming machine, a part of symbols appeared at one game opportunity is reused at the next or more future game opportunity without making any changes. Accordingly, it is not possible to enhance an interest in the game, utilizing an appearance of symbols directed to generating high dividend or the like at one game opportunity, that is, in a process where each reel begins spinning and then stops to thereby settle a symbol on each cell. Further, an effect to be introduced by fixing the symbol can be obtained only at the second or more future game opportunity. Accordingly, there may be inconvenience such that the same player has to continuously play games two or more times on the premise that such effect can be exerted.

Therefore, it is an object of the present invention to provide a gaming machine capable of increasing or decreasing an occasion to allow a specific part of symbols to be appeared through measures different from those conventionally applied, thereby changing player's expectation in regard to obtaining a dividend at one game opportunity.

SUMMARY OF INVENTION

Solution to Problem

One aspect of the present invention, there is provided a gaming machine having a symbol display region in which a plurality of cell columns are arranged, wherein a plurality of cells, each of which serves as a symbol stop position, are continuously disposed on each of the cell columns, and wherein a symbol column in which plural kinds of symbols are continuously disposed, is displayed on each of the cell columns of the symbol display region in such a manner that at least one of the symbols corresponds to one of the cells, comprising: a symbol movement control unit that makes each symbol column move along each cell column at a predetermined game opportunity in such a manner that a symbol to be displayed on each cell is changed in turn according to alignment order of the symbols in each symbol column, and then makes each symbol column stop; a prize winning determination unit that determines whether or not a combination of the symbols stopped in a cell group of a determination target satisfies a prize winning condition; and a dividend generation unit that generates a dividend according to the combination to a player when the combination satisfies the prize winning condition, wherein the symbol movement control unit further comprises, a symbol check unit that determines whether or not a symbol reaching a filtering position, which is set on the cell column, is a specific symbol, and a specific symbol control unit that generates a specific change which is different from a change to be generated according to the alignment order in respect to display of the specific symbol in the symbol display region, when the symbol reaching the filtering position is determined as the specific symbol.

Another aspect of the present invention, there is provided a computer program for a gaming machine having a symbol display region in which a plurality of cell columns are arranged, wherein a plurality of cells, each of which serves as a symbol stop position, are continuously disposed on each of the cell columns, and wherein a symbol column in which plural kinds of symbols are continuously disposed, is displayed on each of the cell columns of the symbol display region in such a manner that at least one of the symbols corresponds to one of the cells. The computer program is configured to make a computer of the gaming machine serve as: a symbol movement control unit that makes each symbol column move along each cell column at a predetermined game opportunity in such a manner that a symbol to be displayed on each cell is changed in turn according to alignment order of the symbols in each symbol column, and then makes each symbol column stop; a prize winning determination unit that determines whether or not a combination of the symbols stopped in a cell group of a determination target satisfies a prize winning condition; and a dividend generation unit that generates a dividend according to the combination to a player when the combination satisfies the prize winning condition. Further, the computer program is configured such that the symbol movement control unit comprises a symbol check unit that determines whether or not a symbol reaching a filtering position, which is set on the cell column, is a specific symbol, and a specific symbol control unit that generates a specific change which is different from a change to be generated according to the alignment order in respect to display of the specific symbol in the symbol display region, when the symbol reaching the filtering position is determined as the specific symbol.

According to the present invention, while the symbols are moving, it is checked whether or not the symbol reaching the filtering position on the cell column is the specific symbol, and if there is the specific symbol, the specific change, which is different from a change to be generated according to the alignment order, occurs in regard to display of the specific symbol in the symbol display region. That is to say, when the symbols move, there is basically produced, in the symbol display region, a change in which the symbols appear and move on the cell according to the alignment order thereof, and then disappear. However, when the specific symbol reaches the filtering position, the specific change different from such basic change of display occurs in respect to display of the specific symbol. Namely, the specific symbol should appear on one end of the cell column as one of the symbols in accordance to the alignment order of the symbols on the symbol column and move along the cell column and disappear from the other end of the cell column. However, according to the present invention, the specific change different from that in accordance with the alignment order occurs in respect to the specific symbol. As the specific change, various changes can be produced in such a manner that the specific symbol may be prevented from appearing or disappearing, that the specific symbol may be changed to a symbol other than the specific symbol, and that the specific symbol may move to the cell different from the cell where the specific symbol should be displayed. Since such specific change is produced, it is possible to increase or decrease opportunity of making some part of symbols appear in the symbol display region, thereby changing player's expectation in regard to obtaining a dividend in the extent of a game to be provided at one game opportunity.

For instance, if the specific symbol is a symbol decreasing the expectation of obtaining a dividend, and more specifically, if the specific symbol is set to a symbol of the kind that provides a relatively low dividend in exchange for a combination including the specific symbol, or if the specific symbol is set to a symbol of the kind that provides relatively low probability of establishing a prize winning condition, it is possible to decrease the opportunity of allowing the specific symbol to appear in the symbol display region by executing a process as the specific change in such a manner that the specific symbol is prevented from appearing, or that the specific symbol is changed to another symbol. In this way, it is possible to raise player's expectation of obtaining a dividend. On the contrary, if the specific symbol is a symbol increasing the expectation of obtaining a dividend, and more specifically, if the specific symbol is set to a symbol of the kind that provides a relatively high dividend in exchange for a combination including the specific symbol, or if the specific symbol is set to a symbol of the kind that provides relatively high probability of establishing a prize winning condition, it is possible to increase the opportunity of allowing the specific symbol to appear in the symbol display region by executing a process as the specific change in such a manner that the specific symbol is prevented from disappearing to thereby remain on the cell column. In this way, it is also possible to raise a player's expectation of obtaining a dividend. Incidentally, if a symbol that causes the expectation of obtaining a dividend to be decreased is set as the specific symbol, and the specific change is configured so as to increase the opportunity of making the specific symbol appear, it is possible to perform management to decrease player's expectation of obtaining the dividend.

DETAILED DESCRIPTION OF THE INVENTION

Description of Embodiments

First Embodiment

Figure 1:
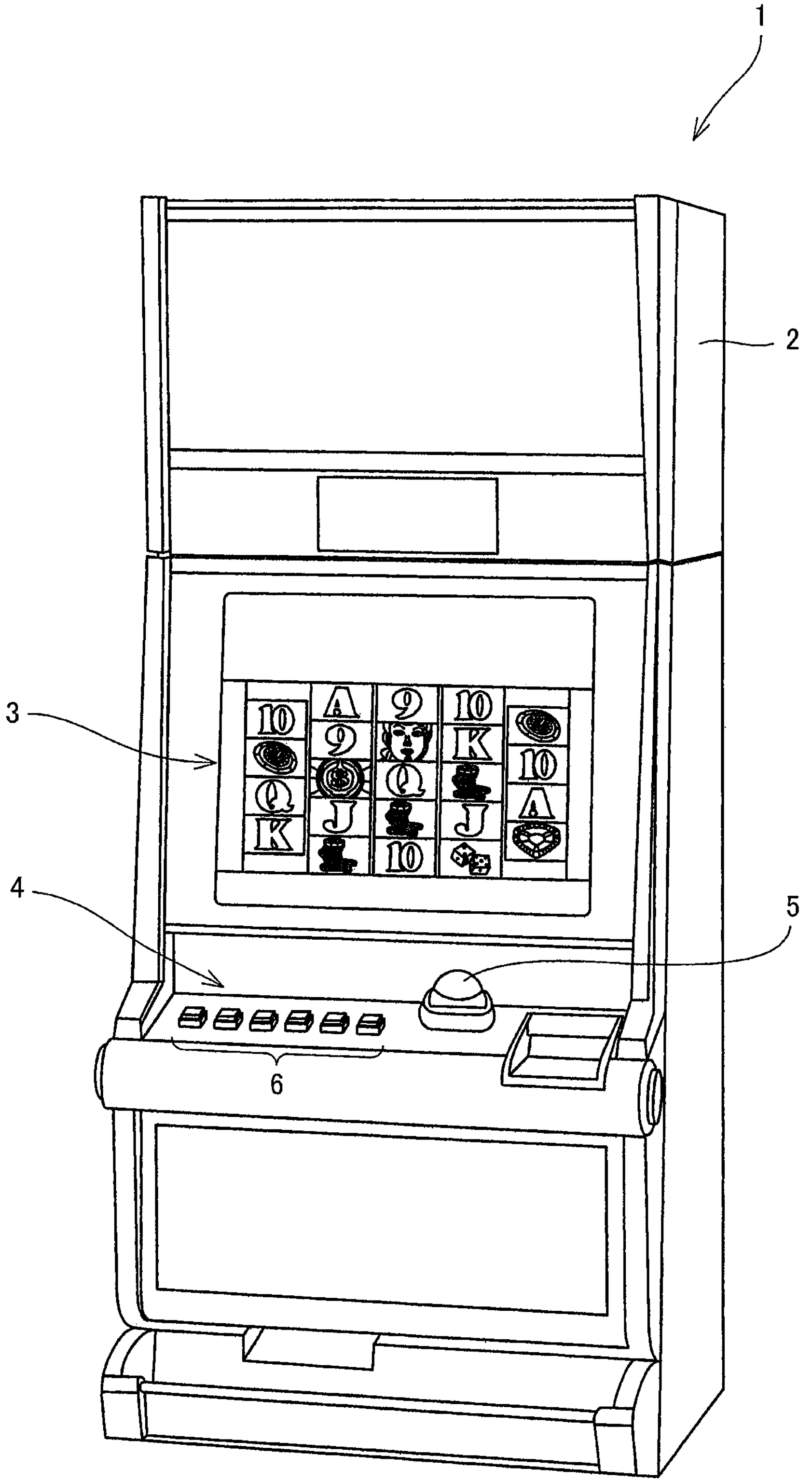
FIG. 1 is a perspective view of a gaming machine according to an embodiment of the present invention.

Hereinafter, the first embodiment in which the present invention is applied to a gaming machine of a slot machine type will be described with reference to the accompanying drawings. As shown in FIG. 1, a gaming machine 1 according to the embodiment has an upright casing 2, and on a front surface of the casing 2 is provided with a display device 3. The display device 3 is, for example, a liquid crystal display device. A control panel 4 is provided below the display device 3. On the control panel 4, there are provided a slot 5 for coins and an operation device 6. The operation device 6 includes operation members for performing various operations such as betting operation, spin starting operation, or the like.

Figure 2:
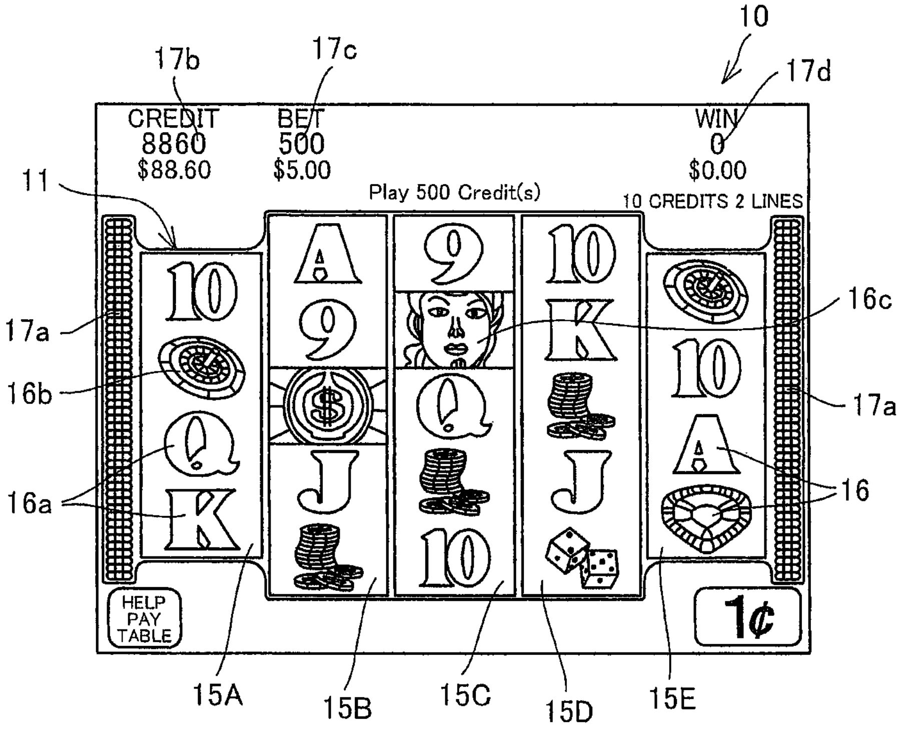
FIG. 2 is a diagram illustrating one example of a game screen to be displayed on a display device.
Figure 3:
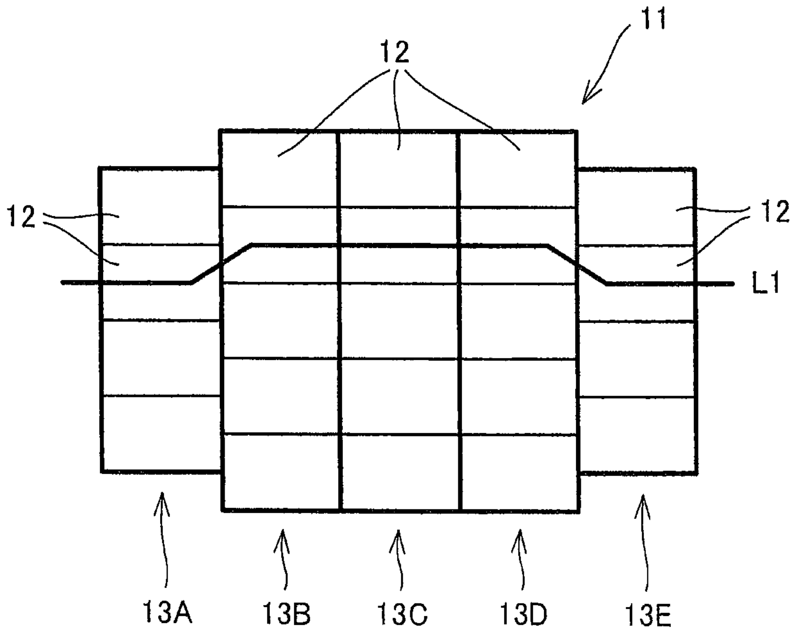
FIG. 3 is a diagram illustrating a configuration of a symbol display region to be established on the game screen.

FIG. 2 shows one example of a game screen to be displayed on the display device 3. A symbol display region 11 is provided in the game screen 10. As shown in FIG. 3, a plurality of cells 12 are defined in the symbol display region 11. Each of the cells 12 has, for example, a rectangular configuration and corresponds to a symbol stop position. The cell 12 may be formed in various shapes, such as a hexagon shape, a circular shape and the like. The cells 12 are arranged so as to form five cell columns 13A to 13E (they are distinguished from each other with heavy lines in the figure) extending along an up and down direction in the symbol display region 11. On both sides of the symbol display region 11 in a right and left direction, the cell columns 13A and 13E are formed in such a manner that four cells 12 are continuously disposed in the up and down direction, respectively. Between these cell columns 13A and 13E, three cell columns 13B, 13C and 13D are formed in such a manner that five cells 12 are continuously disposed in the up and down direction, respectively. Each of the cells 12 in the cell columns 13A and 13E on both sides is disposed so as to be located at an intermediate position between two cells 12 in each of the cell columns 13B to 13D, which are adjacent to each other. Although boundaries of the cells 12 are indicated by solid lines in FIG. 3, the cells 12 may be displayed on the display device 3 in the state where a player can visually grasp them, or display may be omitted. Namely, it is only necessary that the cells 12 are logically or ideally defined in an interior of the gaming machine 1 as symbol stop positions in the symbol display region 11, and it is not indispensable that the boundaries thereof can visually be observed. Hereinafter, the cell columns 13A to 13E may be referred to as the cell columns 13 when they need not to particularly be distinguished from each other. The right and left direction in the symbol display region 11 may be referred to as a line direction and the up and down direction thereof may be referred to as a column direction.

Figure 4:
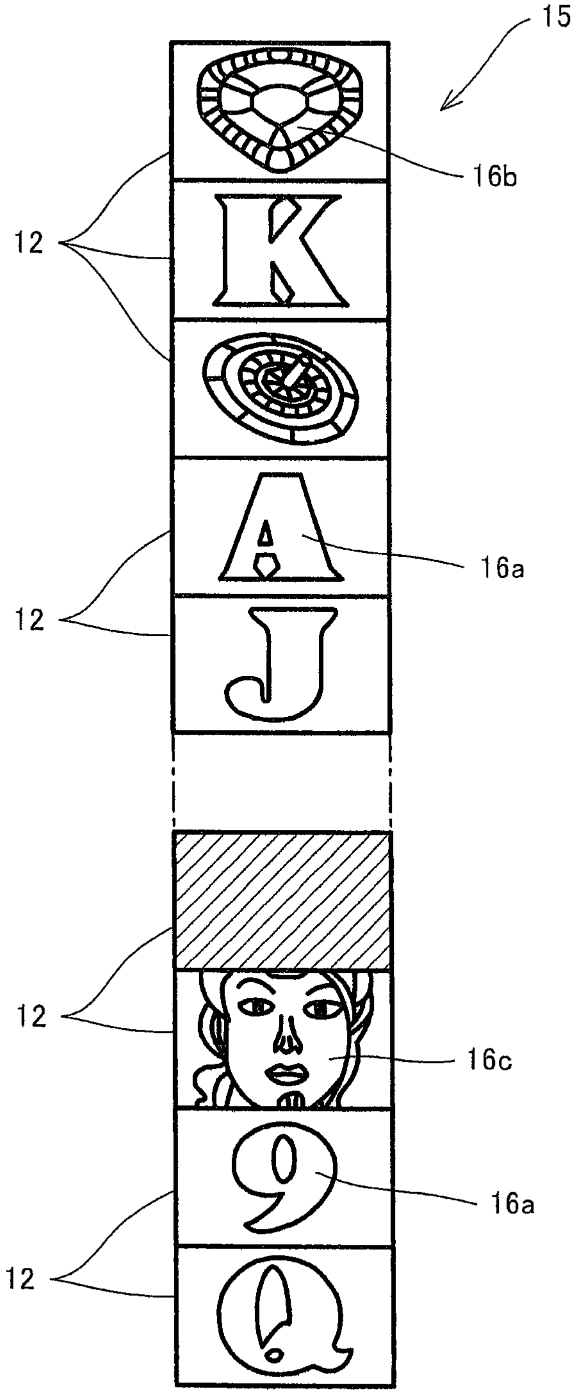
FIG. 4 is a development diagram of a reel.

As shown in FIG. 2, five reels 15A to 15E are disposed in the symbol display region 11 so as to establish a one to one correspondence to the cell columns 13A to 13E (not shown in FIG. 2), respectively. Hereinafter, from the left to the right in the symbol display region 11, the reels 15A to 15E may be referred to as the first reel 15A, the second reel 15B, . . . and the fifth reel 15E. Incidentally, the reels 15A to 15E may be referred to as the reels 15 when they need not to particularly be distinguished. Each of the reels 15 is a video reel (virtual reel) to be represented by an image, and corresponds to a symbol column. On each reel 15, plural kinds of symbols 16 are disposed in a predetermined alignment. One example of the reel 15 is shown in FIG. 4. Incidentally, the reel 15 is ideally in the shape of cylinder, and has a configuration in which plural kinds of symbols 16 are arranged on its outer circumference at a certain pitch along a circumferential direction thereof. In FIG. 4, the reel 15 is shown in the state of developing its outer circumference onto a plane. As the symbols 16, there are presented a card symbol 16*a* representing any one of A, 1, 2, . . . J, Q, and K that are numerals or letters to be given to playing cards, a picture symbol 16*b* representing a picture of coins, dice, chips or the like, and a wild symbol 16*c* representing a face of woman. Incidentally, in this specification and drawings, the symbols 16*a* to 16*c* may be referred to as the symbols 16 when they need not to be distinguished.

Return to FIG. 2, besides the symbol display region 11, there are further provided in the game screen 10 a pair of target line discrimination portions 17*a* to be disposed on both sides on the symbol display region 11 in order to discriminate a line to be a target for prize winning determination (hereinafter, such line may be referred to as a prize winning determination line), a credit number display portion 17*b* where the number of credit held by a player is shown, a bet number display portion 17*c* where the number of bet, that is, the amount of credit that the player bet is shown, a dividend display portion 17*d* where the amount of dividend (represented in the same unit as that of credit) that the player obtains in each game is shown, and the like. Incidentally, the credit is a term to quantitatively represent play value. For instance, the minimum unit for providing a one time game opportunity is determined as one credit. The credit is provided in return for payment of predetermined amount of counter value (monetary value). For instance, if the player throws coins of a predetermined amount into the slot 5, then one credit can be provided in return therefor. The payment of the counter value is not limited to an example using coins, and alternative currency such as medals, tokens and the like may be used for paying the counter value. The counter value may be paid thorough exchange of electronic currency or other electrical information.

If a player bet one or more credits and instructs a game start, one game opportunity is provided. At the one game opportunity, each reel 15 moves from top to bottom along the cell column 13, and thereafter stops at a proper time so as to make one symbol 16 appear on one cell 12. Such movement of the reel 15 may be referred to as a spin. When all reels 15 stop to thereby fix the symbol 16 on each cell 12, it is determined whether or not a combination of symbols arranged on the prize winning determination line forms a predetermined prize winning pattern. In one example, the prize winning pattern is a pattern where symbols 16 of the same kind are completed on all cells 12 on the prize winning determination line which is set to pass through five columns of the reels 15. If the prize winning pattern is formed, the dividend corresponding to the kind of symbols 16 constituting the prize winning pattern is provided to the player. The dividend may be added to the credit, or may be paid to the player through coins (or alternative currency and the like).

The dividend to the player is differentiated in accordance with the probability that the symbols 16 constituting the prize winning pattern appear on the cells 12. In the gaming machine 1, the card symbol 16*a* is configured to have a high probability of appearing in comparison with that of the picture symbol 16*b*. Therefore, the dividend when the card symbols 16*a* are completed is set lower than the dividend when the picture symbols 16*b* are completed. In other words, the dividend when the picture symbols 16*b* are completed is higher than the dividend when the card symbols 16*a* are completed. The wild symbol 16*c* is a universal symbol capable of serving as any other symbols 16 in the prize winning determination. Accordingly, when the wild symbol 16*c* appears on any one of cells 12 on the prize winning determination line, the prize winning pattern can easily be formed. In one example, the probability at which the wild symbol 16*c* appears can be varied depending on the number of each kind of symbol 16 disposed on the reel 15. Here, presupposition can be made in such a manner that a region where one symbol 16 is disposed on the reel 15 is defied as a symbol region, and that the spin of the reel 15 is controlled to make probabilities at which each symbol region stops at the cells 12 coincide with each other. In this case, the kind of symbol 16 having greater numbers is accompanied with the higher probability of appearing on the cell 12. Incidentally, the probability of appearing on the cell 12 is differentiated according to the kinds among the card symbols 16*a*. Similarly, the probability of appearing on the cell 12 is differentiated according to the kinds among the picture symbols 16*b*.

As one example shown by a heavy line L1 in FIG. 3, the prize winning determination line is set to pass through each one of the cells 12 in each cell column 13 generally in the line direction. An assembly of plural cells 12 arranged on the prize winning determination line corresponds to a cell group to be a target for the prize winning determination. The number of prize winning determination lines can appropriately be set. For instance, it is possible to configure such that one prize winning determination line is set when the number of bet is 1 at one game opportunity, and the greater the number of bet, the greater the number of the prize winning determination lines. The arrangement of the prize winning determination lines may be fixed in advance, or the player may be allowed to set a prize winning determination line at an appropriate position every time of betting.

Figure 5:
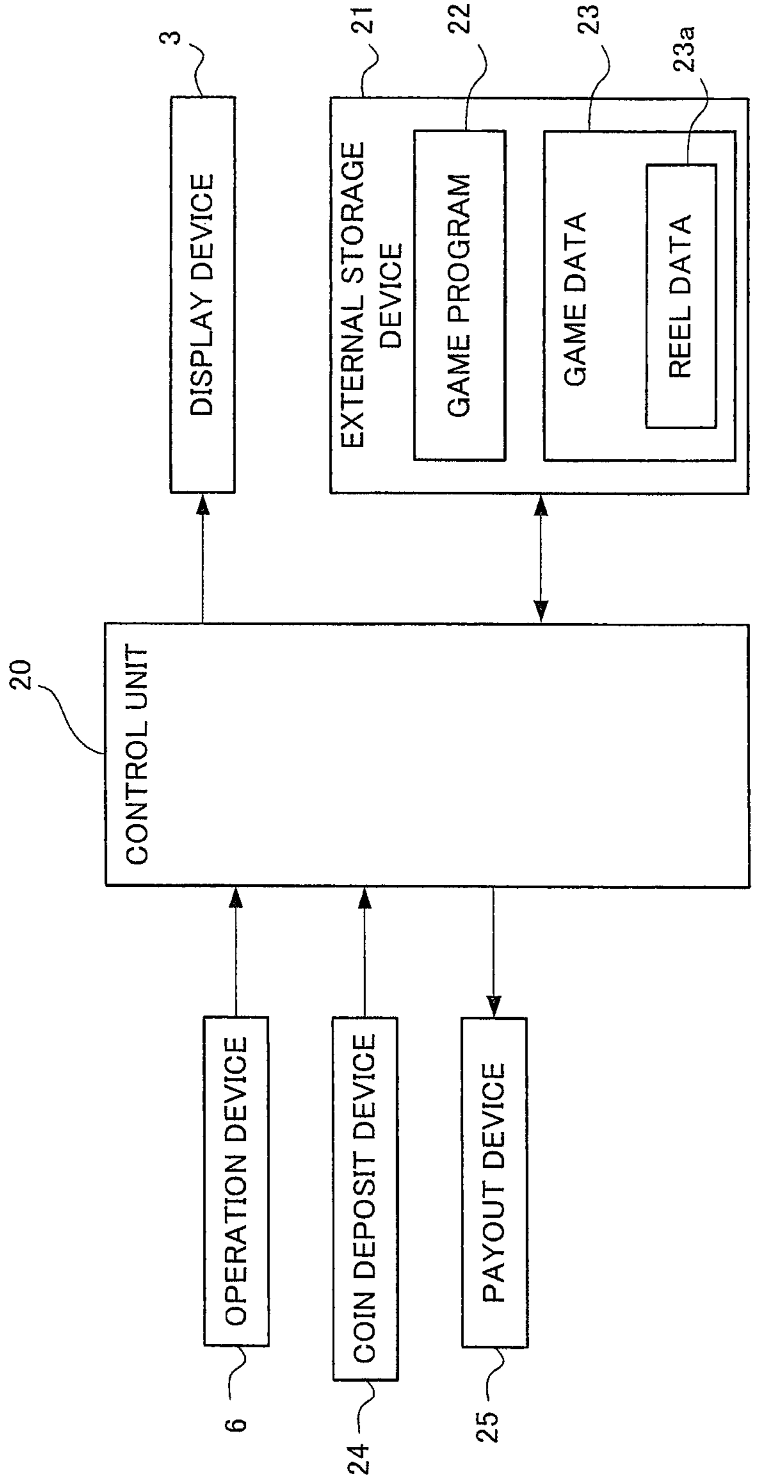
FIG. 5 is a functional block diagram of a control system in the gaming machine shown in FIG. 1.

Next, a configuration of control system in the gaming machine 1 will be described with reference to FIG. 5. In the gaming machine 1, a control unit 20 is provided. The control unit 20 is configured as a computer unit including a microprocessor and other peripheral devices (such as a main storage device) necessary for the operation thereof. The control unit 20 is connected to an external storage device 21. The external storage device 21 has a nonvolatile storage medium, such as a magnetic storage medium, a DVD-ROM, or an EEPROM. The storage medium thereof stores a game program 22 and game data 23 that are needed to make the control unit 20 control a game according to a predetermined procedure. The game program 22 is appropriately read by the control unit 20 and is executed. Also, the game data 23 is appropriately read by the control unit 20 and is referred to. The game data 23 includes reel data 23*a*. The reel data 23*a* is data that describes arrangement of the symbols 16 on each reel 15.

The control unit 20 is connected to the above described operation device 6 and the display device 3. The operation device 6 outputs a signal according to the operation from the player to the control unit 20. The display device 3 displays an image according to an image signal output from the control unit 20. The control unit 20 executes a game in a predetermined procedure according to the game program 22, referring to the output signals of the operation device 6, and displays game screens according to progress status of the game on the display device 3. One example of the game screens is as described with reference to FIG. 2. As described above, the game screen 10 includes an image showing the symbol display region 11, and an image of a portion of the reel 15 to be appeared in the symbol display region 11 (that is, the symbol 16 to be appeared on each cell 12). The control unit 20 serves as a symbol column display unit by displaying these images on the screen of the display device 3.

As an input device or an output device that is needed to execute the game, in addition to the operation device 6 and the display device 3, a coin deposit device 24 and a payout device 25 are connected to the control unit 20. The coin deposit device 24 performs determination as to whether each coin thrown into the slot 5 is true or not, and, if the coin is determined to be true, outputs a signal according to the deposit quantity (deposit amount) to the control unit 20. The payout device 25 executes payment of coins as a dividend of the game to the player according to an instruction from the control unit 20. Incidentally, the counter value of the game may be paid through alternative currency, electric currency and the like, in place of, or in addition to coins. In this case, the coin deposit device 24 and the payout device 25 may be changed suitably.

Next, a control procedure of the game in the gaming machine 1 will be described. In the gaming machine 1, if a signal indicating that coins of the amount necessary for the game are deposited is output from the coin deposit device 24 to the control unit 20, the betting operation through the operation device 6 is enabled. If a signal indicating the betting operation is output from the operation device 6, the control unit 20 executes a betting process. The betting process may be permitted in exchange for consuming the predetermined amount of credits reserved on the gaming machine 1 as a right for the player to play the game. If a signal instructing to start the game is output from the operation device 6 in a state where betting of at least a minimum unit is performed, the control unit 20 determines that one game opportunity is generated, and begins a predetermined game process.

The game process is basically advanced so as to follow the procedure of making each reel 15 spin by a predetermined amount and then stop, determining whether or not the prize winning pattern is formed, and providing the dividend if the prize winning pattern is formed. As for the game process, the gaming machine 1 is provided with at least a normal game process and a special game process. The normal game process is a process provided as a fundamental game process. On the other hand, the special game process is a process to be executed in place of the normal game process in a predetermined special state. A condition for generating the special state may appropriately be established. In one example, the special game process may be executed as a bonus which can be provided in return of forming a specific pattern in the game based on the normal game process. It may be allowable to execute the special game process regardless of the result in the normal game process. For instance, the special game process may only be executed during a specific period of time, or may randomly be executed. The special game process may be executed requiring no payment of counter value, or may be executed under the condition of paying counter value of the same amount as that of the normal game process, or counter value different therefrom. Hereinafter, each game process will be described.

Figure 6:
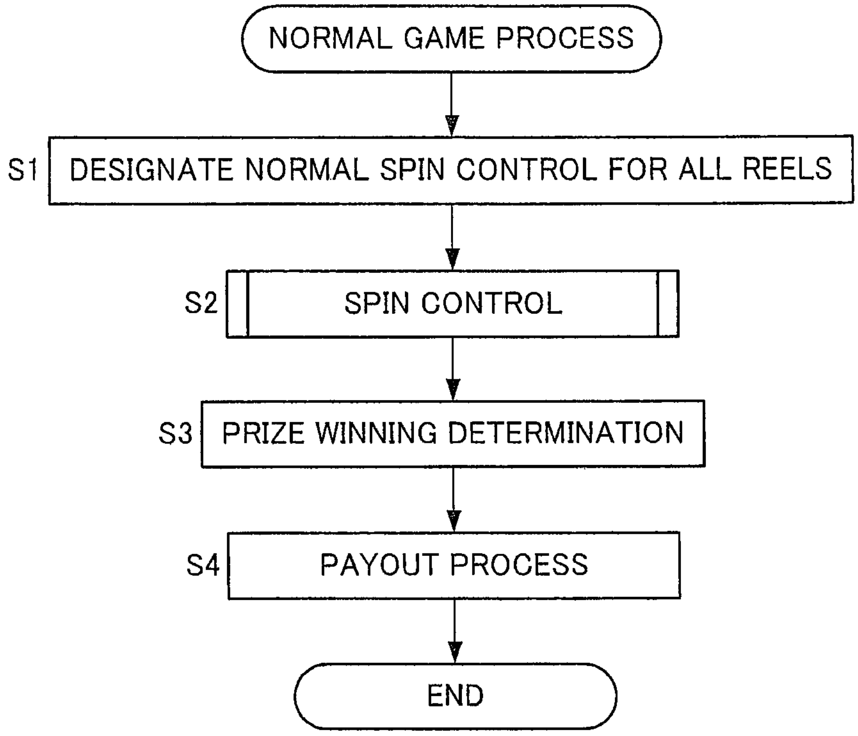
FIG. 6 is a flowchart illustrating a procedure of normal game process.

FIG. 6 shows a procedure of the normal game process to be executed by the control unit 20. In the normal game process, first in step 51, the control unit 20 designates normal spin control for all reels 15, and in subsequent step S2 executes a spin control (in this case, a normal spin control described later). Each reel 15 starts to spin depending on the spin control, and after that each reel 15 stops at a predetermined stop position. The stop position will be described later. After finishing the spin control, the control unit 20 goes to step S3, and then performs a prize winning determination. The prize winning determination is a process of determining whether or not a prize winning pattern is formed by symbols 16 appeared in a cell group of a prize winning determination target. After finishing the prize winning determination, the control unit 20 goes to step S4, and then performs a payout process according to the result of the prize winning determination. If the prize winning pattern is formed in this case, the dividend according to the kind of symbols 16 forming the prize winning pattern is paid out to a player. On the other hand, if the prize winning pattern is not formed, the dividend becomes to zero. Namely, no dividend is paid out. After finishing the payout process, the control unit 20 terminates the normal game process of this time.

Figure 7:
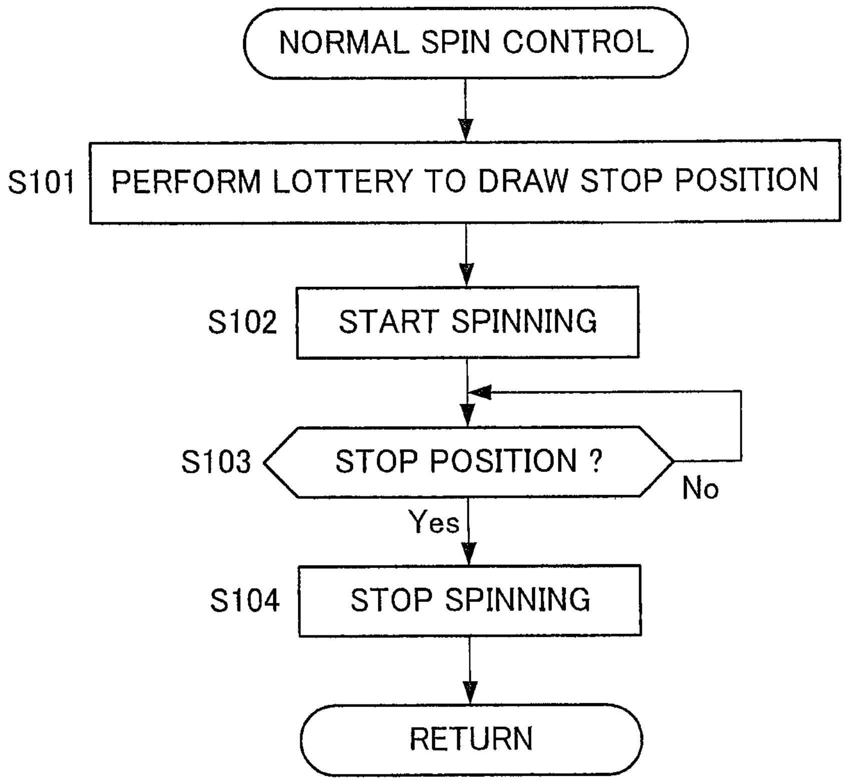
FIG. 7 is a flowchart illustrating a normal spin control routine.

FIG. 7 shows a normal spin control routine to be executed in step S2 of the normal game process. Incidentally, the routine of FIG. 7 is a process to be executed independently for every reel 15. Accordingly, when the control routine of FIG. 7 is executed as a sub-routine in the normal game process of FIG. 6, the normal spin control routine of FIG. 7 is executed independently of each of the first reel 15A to the fifth reel 15E. In the normal spin control routine, first in step S101, the control unit 20 performs a lottery to draw a stop position of each reel 15. The stop position is a position on the reel 15, which overlaps with the cell column 13 when the symbols 16 on the reel 15 finally stop. For instance, in the reel 15 of FIG. 4, a position at which a symbol 16 on an upper end of the reel 15 of FIG. 4 is disposed is defined as a criterion position. Symbol numbers are sequentially assigned along an alignment direction of the symbols 16 from the criterion position, and a lottery is performed to determine what number of symbol 16 should be stopped on a cell 12 to be a criterion in the cell column 13 (e.g. the cell 12 at the center in the cell column 13). In such case, the number of the symbol 16, which should be stopped on the cell 12 of the criterion, serves as the stop position. In one example, when the fifth symbol 16 from the top in FIG. 4 is stopped on the cell 12 at the center in the cell column 13, the stop position of the reel 15 is “5”. Incidentally, the lottery to determine the stop position may be performed using appropriate measures, such as random numbers and the like.

After determining the stop position by the lottery, the control unit goes to step S102, and then makes the reel 15 start spinning from the position at which the symbols 16 previously stopped. In next step S103, the control unit 20 determines whether or not the reel 15 moves to the stop position. If it does not reach the stop position, the control unit 20 repeats the determination in step S103, making the reel 15 spin continuously. Incidentally, speed of the spin may gradually be decreased as the stop position comes closer. When it is determined to be the stop position in step S103, the control unit 20 goes to step S104, and then makes the reel 15 stop spinning. After that, the control unit 20 terminates the normal spin control and then returns to an original process (e.g. the normal game process in FIG. 6). In the normal game process, the normal spin control routine of FIG. 7 is performed for all reels 15. Therefore, all reels 15 spin and then stop, thereby making any one of symbols 16 appear on each cell 12. After that, the prize winning determination in step S3 of FIG. 3 is performed.

Figure 8:
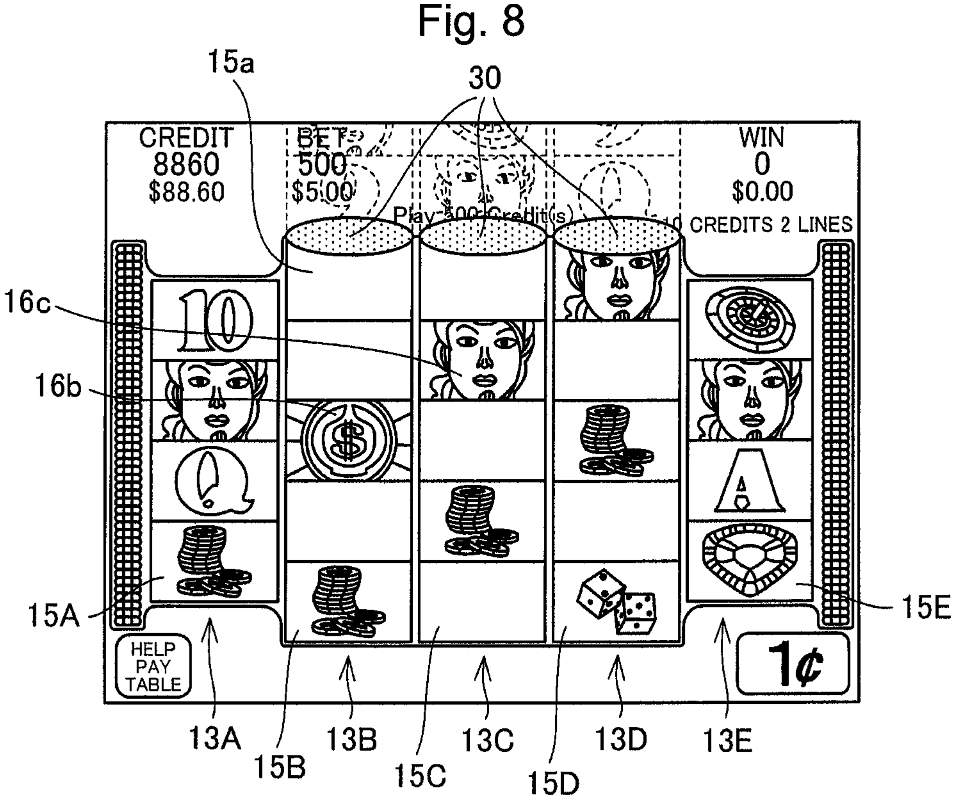
FIG. 8 is a diagram illustrating one example of the game screen when reels begin to spin.
Figure 9A:
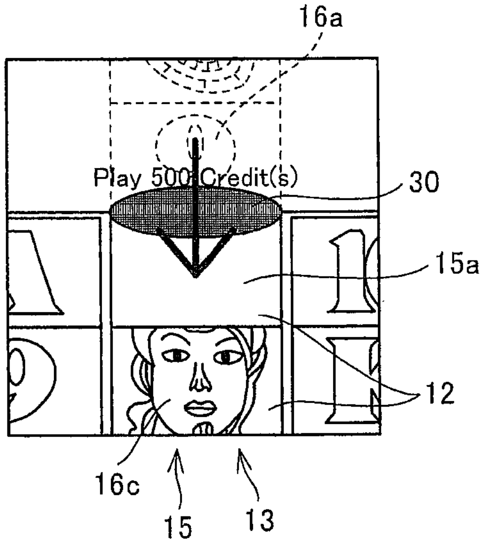
FIG. 9A is a diagram illustrating a state where a non-passing symbol is replaced by a blank through a filter that is set to an upper end of a cell column.
Figure 9B:
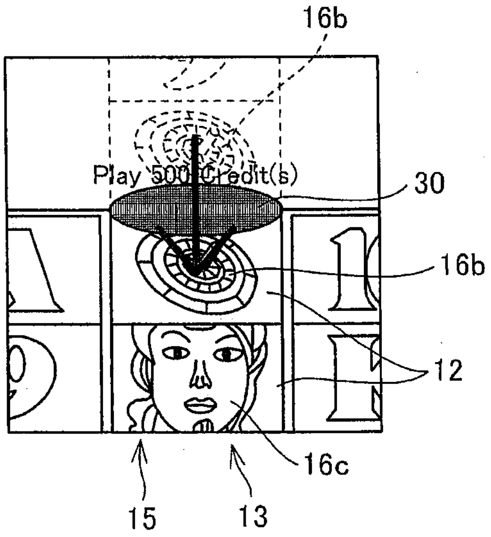
FIG. 9B is a diagram illustrating a state where a passing symbol passes through the filter that is set to the upper end of the cell column.

Next, the special game process will be described. First of all, the summary of the special game process will be explained in reference to the game screen 10, and thereafter a procedure of the control unit 20 will be explained. As shown in FIG. 8, in the special game process, filters 30 are displayed on upper ends of the appropriate cell columns 13 (in an example of the figure, three of the cell columns 13B to 13D corresponding to the second reel 15B to the fourth reel 15D). The upper end of each cell column 13 corresponds to an end portion of the cell column 13 on a side where the symbol 16 appears. The filters 30 are displayed to make a player recognize that filtering is applied to each cell column 13 on which the filter 30 is displayed. The filtering is a process or an operation for making a part of symbols 16 be disabled from passing through the filter 30 and other symbols 16 be enabled to pass through the filter 30. Specifically, as shown in FIG. 9A, the card symbol 16*a* is prohibited to pass through the filter 30. On the other hand, as shown in FIG. 9B, the picture symbol 16*b* and the wild symbol 16*c* are allowed to pass through the filter 30. Hereinafter, the picture symbol 16*b* and the wild symbol 16*c* that can pass through the filter 30 may be referred to as a passing symbol 16, and the card symbol 16*a* that cannot pass through the filter 30 may be referred to as a non-passing symbol.

Figure 10:
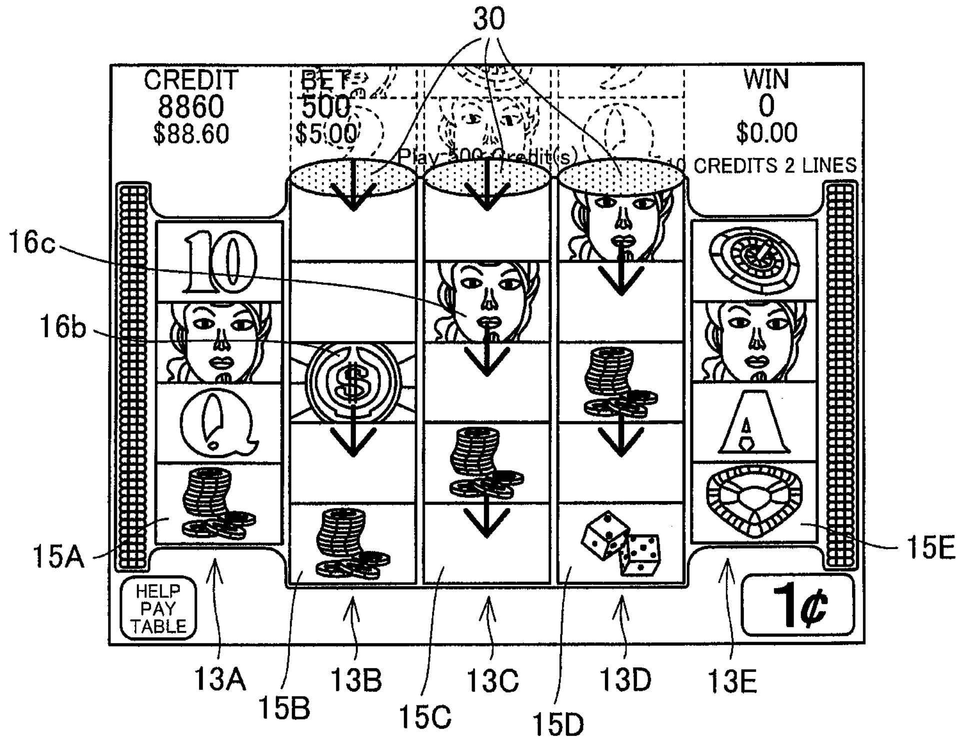
FIG. 10 is a diagram illustrating a game screen following FIG. 8.

When the card symbol 16*a* is prohibited to pass through the filter 30, this card symbol 16*a* is replaced by a blank 15*a* with no symbols 16, thereby appearing on the cell column 13. Since such filtering is applied to the three cell columns 13B to 13D, as shown in FIG. 8, the card symbol 16*a* is disabled from appearing on the cells 12 in the second reel 15B to the fourth reel 15D, and the picture symbol 16*b*, the wild symbol 16*c* and the blank 15*a* move on the cell columns 13 form the top to the bottom. When the reel 15 stops spinning, as shown in FIG. 10, any one of the picture symbol 16*b*, the wild symbol 16*c* and the blank 15*a* appears on each cell 12. The card symbol 16*a* does not appear.

Figure 11:
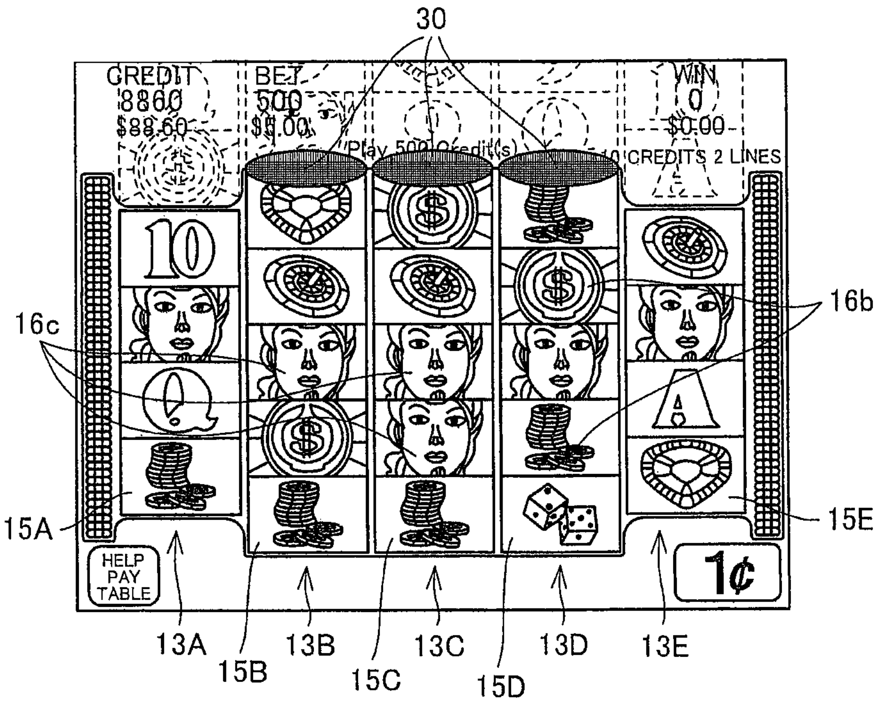
FIG. 11 is a diagram illustrating a game screen following FIG. 10.

After stopping the spin in the state of FIG. 10, then a supplement for the symbols 16 is started with the respect to the blanks 15*a*. The supplement procedure for producing the symbols 16 is an operation for downwardly moving the symbols 16 that are located above the blanks 15*a*, thereby filling up each blank 15*a* with the passing symbol 16. In this operation, it is not possible to fill up the blanks 15*a* by only the symbols 16*a* that have already appeared on the cell columns 13. Therefore, a deficiency thereof is supplemented by moving symbols 16, which have not appeared on the cell column 13 yet, onto the cell column 13. Also in this operation, the filtering is applied to thereby make the card symbol 16*a* be disabled from appearing. As a result, only the picture symbol 16*b* and the wild symbol 16*c* appear on the cell column 13. After completing the supplementation of the symbols 16, as shown in FIG. 11, each cell 12 in the cell columns 13B to 13D is filled up with the picture symbol 16*b* or the wild symbol 16*c*. Namely, in the cell column 13 subject to the filtering, the kind of the symbol 16 on each cell 12 is determined in such a manner that none of the card symbols 16*a* exists thereon. Since such process is performed, a prize winning pattern of high dividend can easily be formed. Accordingly, it is possible to raise player’s expectation with respect to the high dividend.

Figure 12:
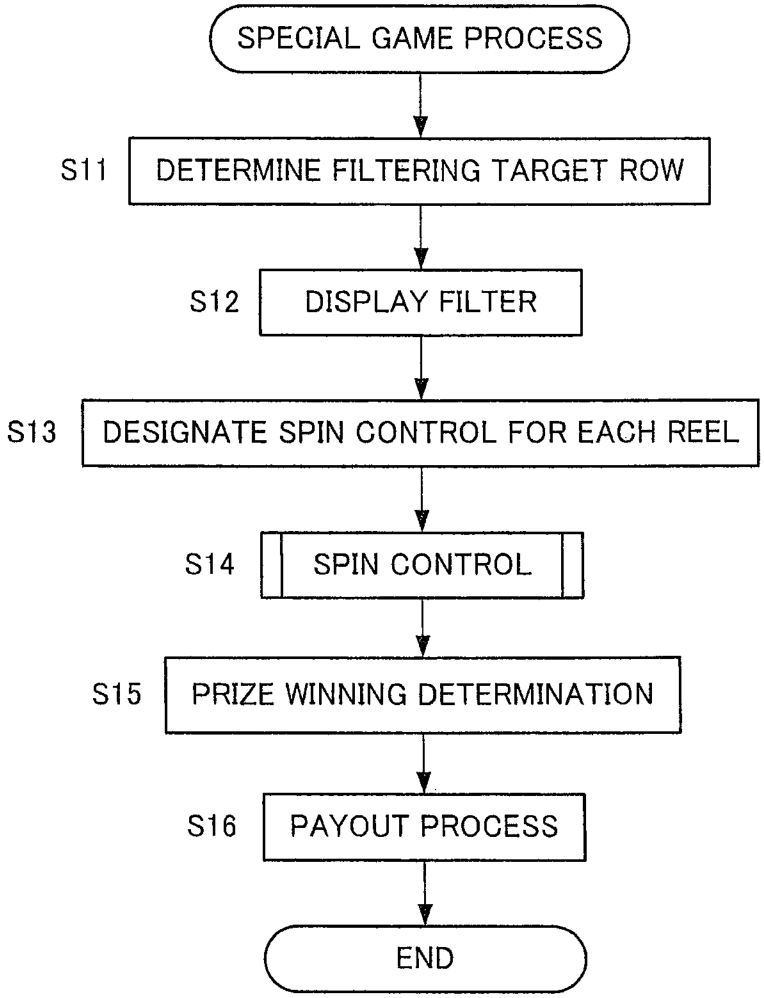
FIG. 12 is a flowchart illustrating a procedure of special game process.

FIG. 12 shows a procedure of the special game process by the control unit 20. In the special game process, first in step S11, the control unit 20 determines the cell column 13 to be a target of filtering (hereinafter may be referred to as a filtering target column). For instance, one or more cell columns 13 within intermediate cell columns 13B to 13D can appropriately be determined as the filtering target column. It is allowable to subdivide a condition for generating the special state, thereby varying the number of filtering target columns in accordance with the state as to whether the condition is satisfied or not. Alternatively, when the special state is generated, each of the intermediate three cell columns 13B to 13D is inevitably determined as the filtering target column. As to the cell columns 13A and 13E on both sides, they may appropriately be determined as the filtering target columns.

Figure 13:
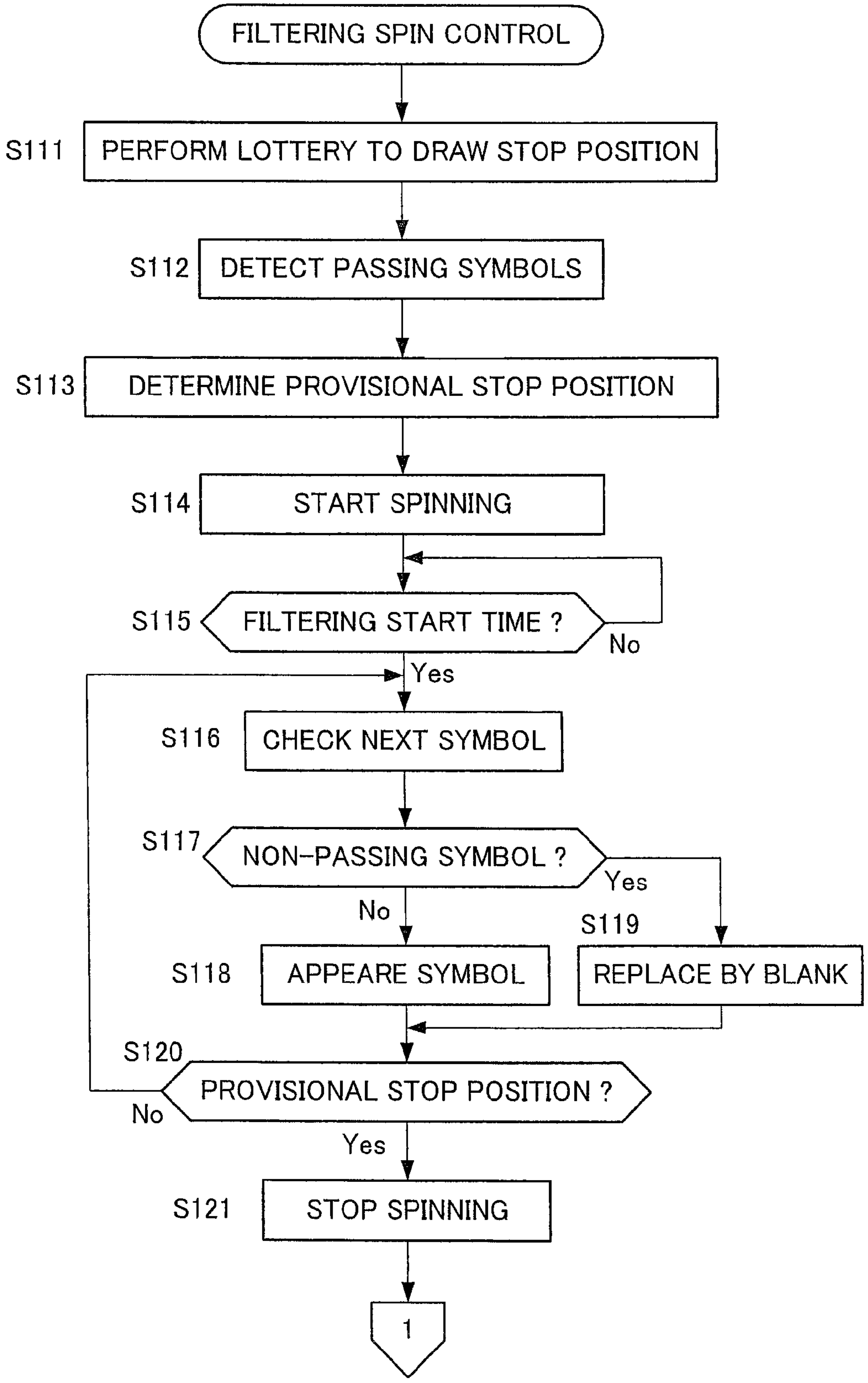
FIG. 13 is a flowchart illustrating a filtering spin control routine according to the first embodiment.

After determining the filtering target column, the control unit 20 goes to step S12, and then displays the filter 30 on the upper end of the cell column 13 determined as the filtering target column. In subsequent step S13, the control unit 20 designates spin control for each reel 15. In this case, filtering spin control (FIG. 13) is designated for the reels 15 on the filtering target columns, and for other reels 15, the normal spin control (FIG. 7) is designated. In next step S14, the control unit 20 executes the spin control. In this case, the filtering spin control of FIG. 13 is executed for the reels 15 on the filtering target columns, and for other reels 15, the normal spin control of FIG. 7 is executed. Each reel 15 starts to spin owing to the spin control in step S13, and then each reel 15 stops at a predetermined stop position. After finishing the spin control, the control unit 20 goes to step S15 to thereby perform the prize winning determination, and, in subsequent step S16, performs a payout process according to the result of the prize winning determination. The prize winning determination in step S15 and the payout process in step S16 are similar to the processes in step S3 and step S4 of FIG. 6. After finishing the payout process in step S16, the control unit 20 terminates the special game process of this time.

Figure 14:
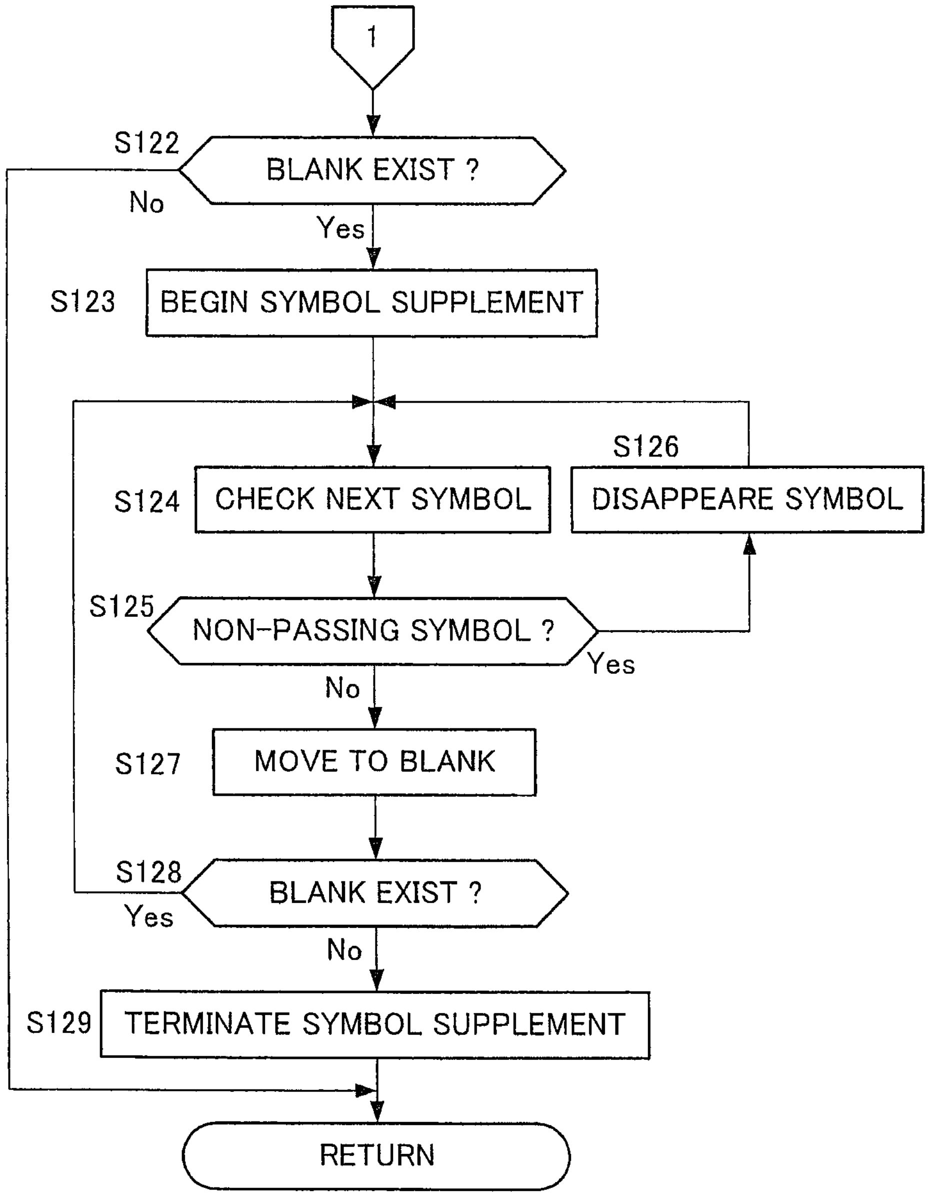
FIG. 14 is a flowchart following FIG. 13.

FIGS. 13 and 14 show a filtering spin control routine to be executed in step S13 of the special game process. Incidentally, this routine is a process to be executed independently for every reel 15. Accordingly, if the control routine of FIGS. 13 and 14 is executed as a subroutine in the special game process of FIG. 12, the filtering spin control routine of FIG. 13 is executed independently for each of the reels 15 of the first reel 15A to the fifth reel 15E, which corresponds to the cell column 13 of the filtering target. In the filtering spin control routine, first in step Sill, the control unit 20 performs a lottery to draw a stop position of the reel 15. As described above, the lottery of the stop position is a process to determine which symbol 16 on the reel 15 should be appeared on the cell 12. For instance, as specified by a heavy line on the reel 15 of a developed state shown in FIG. 15, the stop position is determined to make an appropriate range on the reel 15 correspond with the cell column 13. Incidentally, FIG. 15 is an example where the cell column 13 with continuously arranged five cells 12 is set as the filtering target column.

Return to FIG. 13, after determining the stop position, the control unit 20 goes to step 112, and then detects the passing symbols 16 (the picture symbol 16*b* and the wild symbol 16*c*) of a predetermined number, which are disposed ahead of the stop position in a spin direction of the reel 15. The predetermined number is a number of the cells 12 below the cell 12 to which the stop position is set. In this case, since the stop position is set to the central cell 12 on the cell column 13, the number of the cells 12 below the central cell 12 is two, so that two of passing symbols 16 are detected in step S112. In subsequent step S113, the control unit 20 determines a provisional stop position. In an example of FIG. 15, these processes will be explained as follows.

Figure 15:
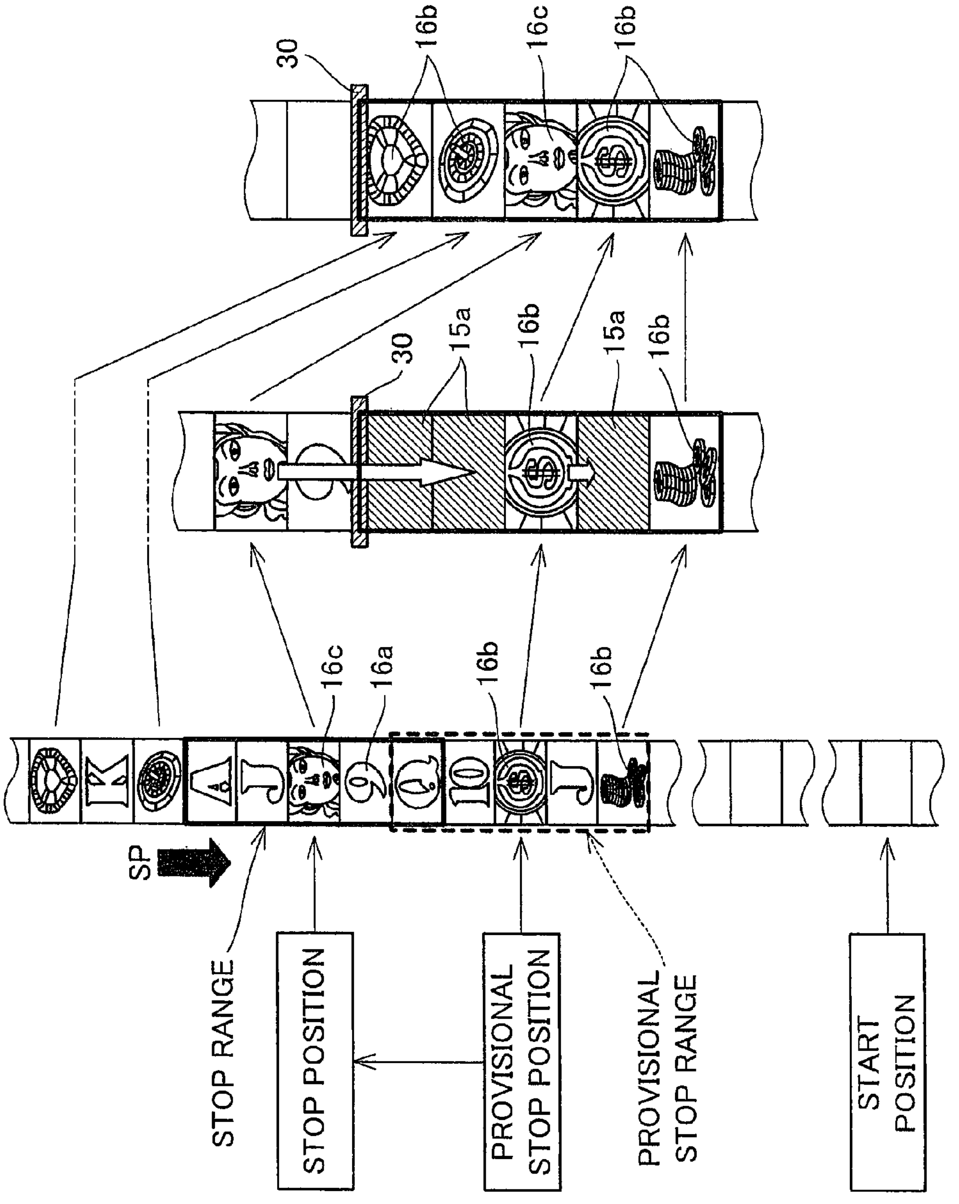
FIG. 15 is a diagram illustrating a correspondence relationship between a cell column to which the filtering spin control according to the first embodiment is applied and symbols on a reel.

In the reel 15 of the developed state of FIG. 15, the heavy line shows a range of the symbols 16 (stop range) to be appeared on the cell column 13, and the position of the symbol 16 at the center of the stop range is referred to as the stop position. This stop position is determined by the lottery performed in step S111. After determining the stop position, then the passing symbols 16 of the predetermined number are detected below the stop position (step S112). In the illustrated example, two passing symbols 16 can be detected. Next, as illustrated by a dotted line in FIG. 15, the provisional stop range is determined in such a manner that the detected two passing symbols 16 are included therein and that no passing symbols 16 exist below the detected two passing symbols 16 in the provisional stop range. Thereafter, the symbol 16 on the center of the provisional stop range is determined as the provisional stop position (step S113). The reason why the provisional stop position is determined as well as the stop position is as follows.

If the reel 15 stops in the state that the stop position accords with the central cell 12, the symbol 16 of the stop position may be shifted downward to fill up the blank 15*a*. In order to finally stop the symbol 16 of the stop position at the central cell 12 after the blanks 15*a* are filled up, the reel 15 needs to stop in a state that two passing symbols 16, which are disposed ahead of the symbol 16 of the stop position in the spin direction, appear on the cell column 13 at the time of starting the filling up process of the blanks 15*a*. Accordingly, there is defined the provisional stop position, and the reel 15 is provisionally stopped at the provisional stop position.

In the example of FIG. 15, the passing symbol 16 taking the second place from the stop position is a picture symbol 16*b* representing chips. There are four of the card symbols 16*a* from the stop position to this picture symbol 16*b*. Accordingly, if these card symbols 16*a* are replaced by the blanks 15*a* and these blanks 15*a* are filled up by the passing symbols 16 after making the reel 15 stop at the provisional stop position, the wild symbol 16*c* of the stop position finally appears on the central cell 12. Incidentally, if at least one of the non-passing symbols 16 exists between the second passing symbol 16 and a passing symbol 16 taking the third place from the stop position in the spin direction, the provisional stop position may be shifted in the spin direction within an extent of the number of the non-passing symbols 16 existing between the second and third passing symbols 16.

Returning to FIG. 13, the explanation will be followed. After determining the provisional stop position, the control unit 20 goes to step S114, and then makes the reel 15 start to spin. In this case, the spin is started from the position at which the reel 15 previously stopped. In subsequent step S115, the control unit 20 determines whether or not the start time of the filtering comes. The start time of the filtering may be set to the same time as the start time of the spin, or may be set to a late time from the start time of the spin. Namely, as long as the filtering is started before the non-passing symbol 16 (the card symbol 16*a*) in the provisional stop range on the reel 15 reaches the filtering position, the start time of the filtering may be set to an appropriate time during the spin. If the filtering start time does not come, the control unit 20 repeats the determination of step S115, continuing the spin. On the other hand, if the filtering start time comes in step S115, the control unit 20 goes to step S116, and then checks the kind of the symbol 16 reaching the filter 30, in other words, the symbol 16 directed to be appeared on the cell column 13 next time. This check may be performed to distinguish between the passing symbol 16 and the non-passing symbol 16. In subsequent step S117, the control unit 20 determines whether or not the next symbol 16 is the non-passing symbol 16 based on the result of the check. If it is not the non-passing symbol 16, the control unit 20 goes to step S118, and then allows the symbol 16 to pass through the filter 30, to thereby make the symbol 16 appear on the upper end cell 12. On the other hand, if the symbol 16 is determined as the non-passing symbol 16 in step S117, the control unit 20 goes to step S119, prevents the symbol 16 from passing through the filter 30 and make the blank 15*a* be appeared on the uppermost cell 12 instead of the symbol 16.

After finishing the process of step S118 or S119, the control unit 20 goes to step S120, and then distinguishes whether or not the spin of the reel 15 advances to the provisional stop position (refer to FIG. 15). If it does not advance to the provisional stop position, the control unit 20 returns to step S116, continuing the spin. On the other hand, when determining advancement to the provisional stop position in step S120, the control unit 20 goes to step S121, and then stops the spin of the reel 15. Incidentally, during the repetition of the processes from step S116 to step S120, the speed of the spin may gradually be lowered as the provisional stop position comes closer.

After stopping the spin in step S121, the control unit 20 goes to step S122 of FIG. 14. In step S122, the control unit 20 distinguishes whether or not the blank 15*a* exists on each cell 12 of the cell column 13. If the blank 15*a* does not exist, the control unit 20 terminates the filtering spin control routine of this time. On the other hand, if the blank 15*a* exists, the control unit 20 goes to processes in step S123 and the later to supply the blank 15*a* with the passing symbol 16. First of all, the control unit 20 begins a symbol supplement in step S123. In this process, as previously described, the symbols 16 that have already appeared on the cell column 13 move in the spin direction (downward direction) to thereby fill up the blank 15*a* with the passing symbol 16. With the supplement of the blank 15*a*, symbols 16 before the filter 30, that is, symbols 16 on the reel 15, which have not appear on the cell column 13 yet, move downward in turn according to their alignment order. In subsequent step S124, the control unit 20 checks the kind of the symbol 16 reaching the filter 30. This check is similar to that in step S116 of FIG. 13.

In next step S125, the control unit 20 determines whether or not the checked symbol 16 is the non-passing symbol 16. If it is the non-passing symbol 16, the control unit 20 goes to step S126 to make this symbol 16 disappear, and then returns to step S124 to check the next symbol 16. In this case, it is only necessary to disappear the symbol 16, and the blank 15*a* never appear. On the other hand, if it is determined in step S125 that the symbol 16 is not the non-passing symbol 16, the control unit 20 goes to step S127. In step S127, the control unit 20 allows the symbol 16 to pass through the filter 30, and then makes this symbol 16 move to the blank 15*a* on the cell column 13.

FIG. 15 shows the state where the blanks 15*a* are filled up with the symbols 16 by executing the above processes. This example corresponds to the reel 15 shown in the developed state in the same figure. Namely, in FIG. 15, the provisional stop position is set to the picture symbol 16*b* representing coins, and the spin of the reel 15 is provisionally stopped on the position where this picture symbol 16*b* reaches the central cell 12. However, one blank 15*a* exists below the central cell 12, and two blanks 15*a* exist above it. Accordingly, first of all, the picture symbol 16*b* on the central cell 12 moves downward by one step to fill up the blank 15*a*. On the other hand, above the central cell 12, two blanks 15*a* exist in exchange of the card symbols 16*b* of "10" and "Q", the card symbol 16*a* of "9" exists before the filter 30, and further above it, the wild symbol 16*c* exists. Therefore, the wild symbol 16*c* moves to the cell 12 of one step up from the picture symbol 16*b* of the coins that has moved to the cell 12 of one step down.

Return to FIG. 14, the control unit 20 goes to step S128 after finishing the supplement of the symbols 16 to the blanks 15*a*. In step S128, the control unit 20 determines whether or not the blank 15*a* still remains on the cell column 13. If it remains, the control unit 20 returns to step S124 to supply the blank 15*a* with the symbol 16. On the other hand, when it is determined in step S128 that no blanks 15*a* exist, the control unit 20 goes to step S129, and then terminates the supplement depending on the movement of the symbols 16. Thereafter, the control unit 20 terminates the filtering spin control routine of this time, and then returns to an original process (e.g. the special game process of FIG. 12). Since all blanks 15*a* are filled up as described above, all cells 12 are filled up with the picture symbol 16*b* or the wild symbol 16*c* as shown in the rightmost portion of FIG. 15. There is a correspondence relationship between original symbols 16 on the reel 15 and symbols 16 that finally appear on the cells 12 of the cell column 13 as indicated by arrows in FIG. 15.

Since the filtering spin control is executed for the reel 15 of the filtering target column, while the normal spin control is executed for other reels 15, the symbols 16 to be finally appeared on all cells 12 in the symbol display region 11 are determined. After that, the process advances to step S15 of the special game process, thereby performing the prize winning determination and the payout process in turn. Due to the above, the movement of the symbols 16 is controlled as exemplified in FIG. 8, FIG. 10 and FIG. 11, and the movement of the symbols 16 is finally terminated in the state that each of the cells 12 lying on the second to fourth cell columns 13B to 13D is filled up with the picture symbol 16*b* or the wild symbol 16*c*. In this way, the probability of forming the prize winning patter with a high dividend can be increased. In the process where the reel 15 starts spinning and thereafter the symbols 16 finally stop, the numbers of the picture symbol 16*b* and the wild symbol 16*c*, which are appearing on the cells 12 in the symbol display region 11, gradually increase. Accordingly, it is possible to raise the player's expectation of obtaining a high dividend at one game opportunity. Such function or effect is not limited to a case where two or more game opportunities are continuously given to a player, but can be exerted at one game opportunity.

In the above described embodiment, the control unit 20 serves as a symbol movement control unit by executing step S2 of FIG. 6 or step S14 of FIG. 12, serves as a prize winning determination unit by executing step S3 of FIG. 6 or step S15 of FIG. 12, and serves as a dividend generation unit by executing step S4 of FIG. 6 or step S16 of FIG. 12. Further, the control unit 20 serves as a symbol check unit by executing step S116 of FIG. 13 and step S124 of FIG. 14, and serves as a specific symbol control unit by executing steps S117 to S120 of FIG. 13 and steps S122, S123, and S125 to S129 of FIG. 14. Also, steps S122, S123, and steps S125 to S129 correspond to a supplement process. Furthermore, since the card symbol 16*a* is prevented from passing through the filter 30 to thereby be replaced by the blank 15*a* and the symbol 16 other than the card symbol 16*a* is supplied to the blank 15*a* appearing when the reel stops, a specific change, which is different from a change to be generated according to an alignment order of the symbols 16, can be introduced with respect to display of the specific symbol in the symbol display region 11.

In the above embodiment, the card symbol 16*a* is set to serve as the specific symbol. The card symbol 16*a* is a symbol of the kind that provides a relatively low dividend when the prize winning condition is established. The specific symbol is not limited to the card symbol 16*a*, and may appropriately be selected from a kind of symbol which provides a relatively low dividend when the prize winning condition is satisfied, or a kind of symbol which provides relatively low probability of satisfying the prize winning condition. For instance, some part of the card symbols 16*a* with smaller amount of dividend may be set as the specific symbol, or only a part of symbols 16 with lower probability of forming the prize winning condition due to small number thereof may be set as the specific symbol. According to such setting of the specific symbol, it is possible to raise possibility of obtaining a high dividend or possibility of forming the prize winning pattern to generate a dividend, thereby raising expectation of a player. Incidentally, in the first embodiment, a symbol which provides a relatively high dividend when the prize winning condition is satisfied, or a symbol which provides relatively high probability of forming the prize winning condition, such as some part of picture symbols 16*b* and the wild symbol 16*c* may be set as the specific symbol, so that management may be performed to consciously lower player's expectation of obtaining a dividend. The procedure of determining the stop position of the reel 15 in the foregoing embodiment is merely one example, and it may be changed suitably.

Second Embodiment

Next, a gaming machine according to the second embodiment of the present invention will be described. The gaming machine is the one in which details of filtering is changed from that of the gaming machine 1 according to the first embodiment. Accordingly, the explanation will be focused on differences from the first embodiment below, and the same reference signs will be given to features that are common to those of the first embodiment, thereby omitting explanation thereof.

Figure 16:
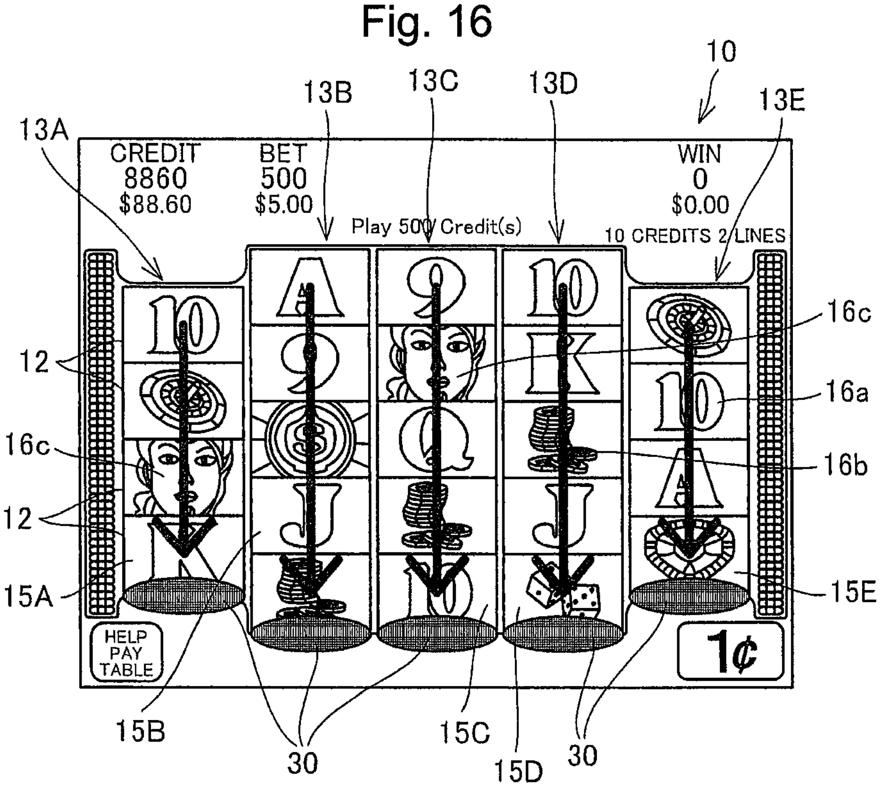
FIG. 16 is a diagram illustrating a game screen when reels begin to spin in the second embodiment.
Figure 17:
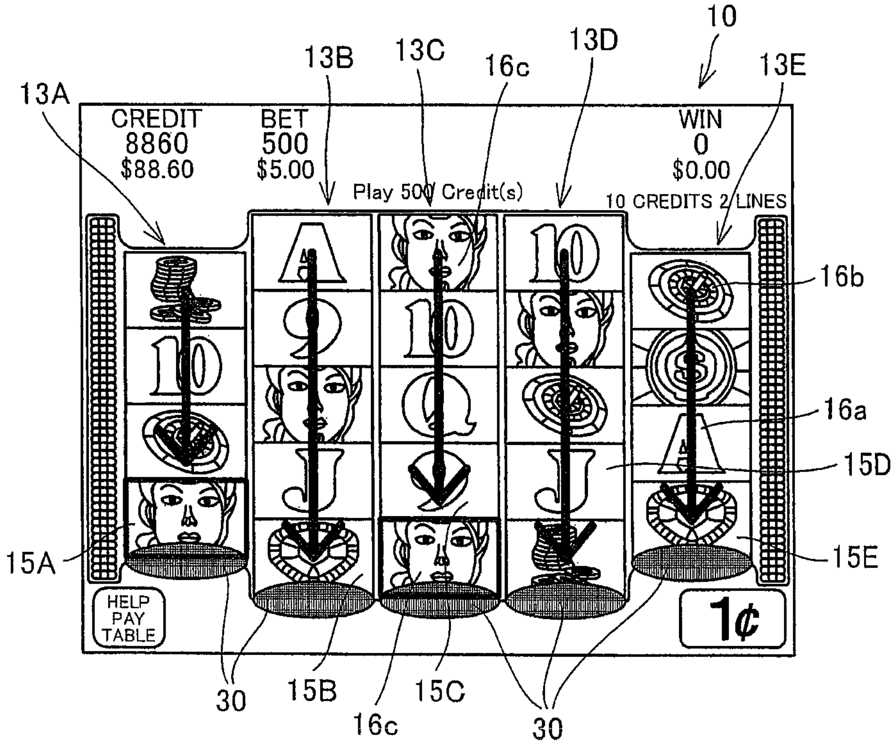
FIG. 17 is a diagram illustrating a game screen following FIG. 16.
Figure 18:
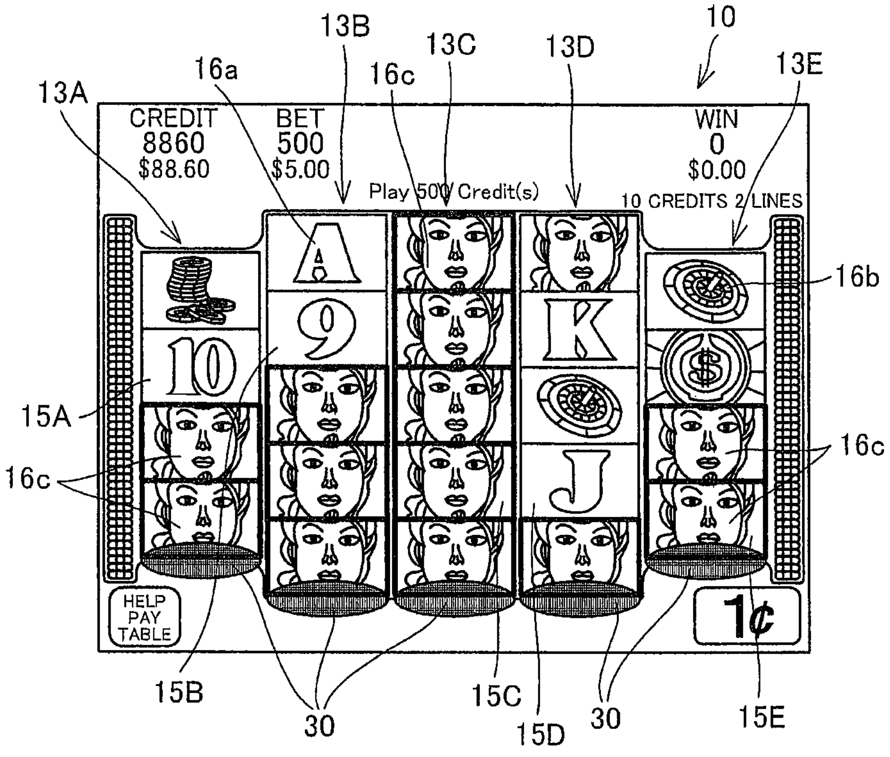
FIG. 18 is a diagram illustrating a game screen following FIG. 17.

FIG. 16 to FIG. 18 show the game screens 10 in the special game process according to the second embodiment. In the second embodiment, the filters 30 are displayed on lower ends of the appropriate cell columns 13 (in an example of the figures, all of the cell columns 13A to 13E), respectively. Similar to the first embodiment, these filters 30 are displayed to make a player recognize that filtering is applied to each cell column 13 on which the filter 30 is displayed. Also, similar to that of the first embodiment, the filtering is performed to make a part of symbols 16 prevent from passing through the filter 30 and to make other symbols 16 be enabled to pass through the filter 30, however, the distinction between the non-passing symbol 16 and the passing symbol 16 differs from that of the first embodiment. In the second embodiment, the wild symbol 16*c* is set as the non-passing symbol 16 and other symbols 16, that is, the card symbol 16*a* and the picture symbol 16*b* are set as the passing symbols. The wild symbols 16*c* of the non-passing symbols 16 are stocked on the cell column 13 so as to be stacked on the filter 30. In other words, once the wild symbol 16*c* has appeared on the filtering target column, thereafter it does not disappear from the symbol display region 11 and remains on the filter 30.

The explanation will be given referring to the reel 15C in FIG. 16 and FIG. 17. First of all, as shown in FIG. 16, when the wild symbol 16*c* appears on the cell column 13C, and reaches the filter 30 as shown FIG. 17, this wild symbol 16*c* is regarded as the non-passing symbol 16, and is stocked at that position. Next, the wild symbol 16*c* appears on the cell column 13C, this wild symbol 16*c* is stocked so as to be stacked by one step on the wild symbol 16*c* that has already been stocked. Since such process is repeated on the cell column to be a filtering target (hereinafter, also referred to as a filtering target column in this embodiment), the wild symbols 16*c* are progressively stocked on the cell column 13 as shown in FIG. 18. Since the wild symbols 16*c* are stocked on the cell column 13 in this manner, the prize winning pattern can easily be formed, using these wild symbols 16*c*. Accordingly, it is possible to raise player's expectation in regard to obtaining a dividend.

Figure 19:
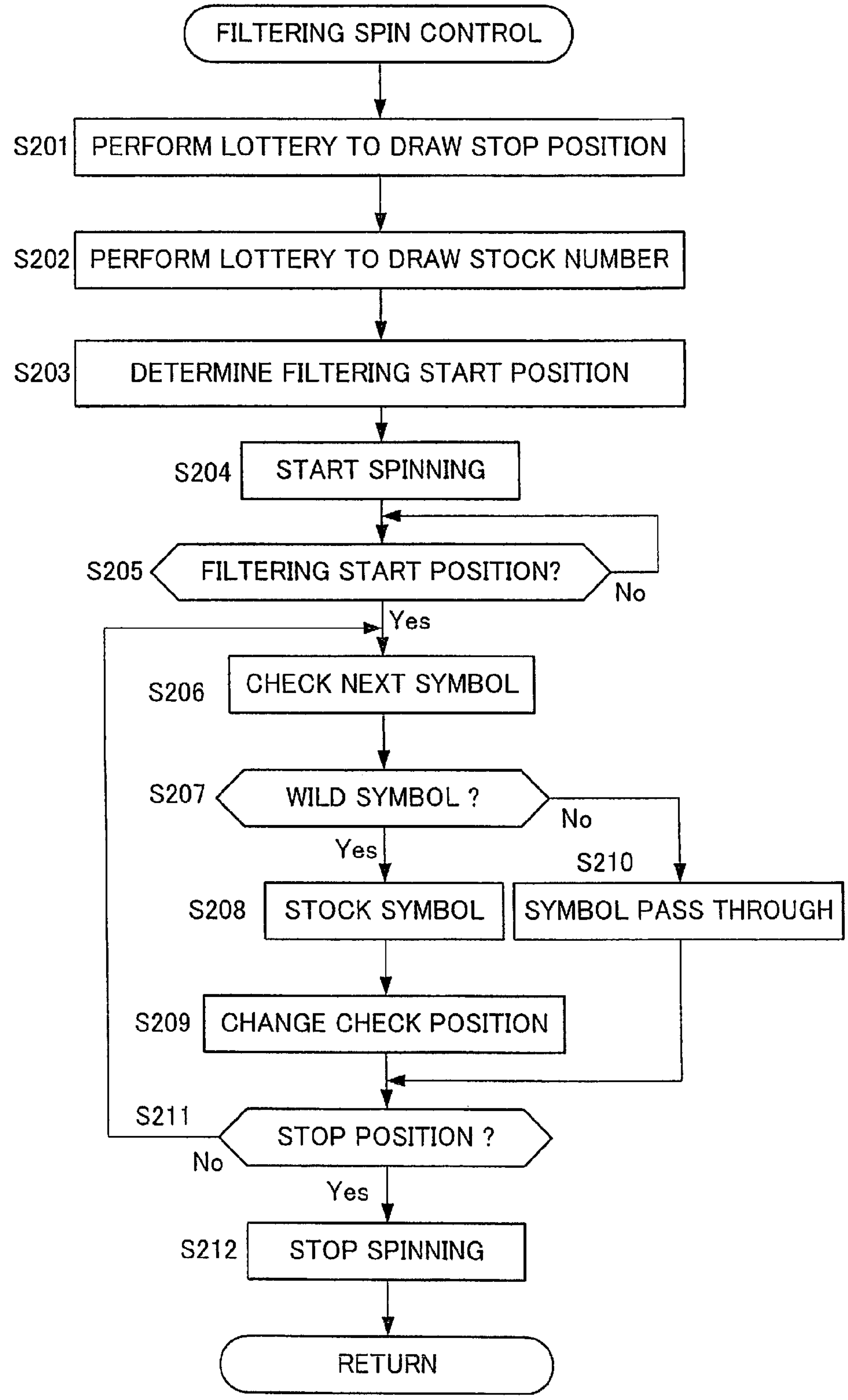
FIG. 19 is a flowchart illustrating a filtering spin control routine according to the second embodiment.

FIG. 19 shows a filtering spin control routine that the control unit 20 executes to implement the filtering exemplified in FIG. 16 to FIG. 18. This routine is executed in place of the filtering spin control routine of the first embodiment (FIG. 13 and FIG. 14). Incidentally, the routine of FIG. 19 is a process to be executed independently for every reel 15. Accordingly, if the control routine of FIG. 19 is executed as a subroutine in the special game process of FIG. 12, the filtering spin control routine of FIG. 19 is executed independently for each of the reels 15 of the first reel 15A to the fifth reel 15E, which corresponds to the filtering target column. If all of the cell columns 13 are filtering target columns, the routine of FIG. 19 is executed independently for all reels 15.

When starting the filtering spin control routine of FIG. 19, first in step S201, the control unit 20 performs a lottery to draw a stop position of the reel 15. The lottery to draw the stop position is performed in the same way as that in step Sill of FIG. 13. After determining the stop position, the control unit 20 goes to step 202, and then determines a stock number of the wild symbols 16*c*. The stock number is the number of the wild symbols 16*c* remaining on the cell column 13. The stock number is determined within the extent of the number of the cell columns 13 to which the filtering should be applied. The determination of the stock number may be performed using random numbers and the like. In next step S203, the control unit 20 determines a filtering start position of the reel 15. In an example of FIG. 20, the above processes will be explained as follows.

Figure 20:
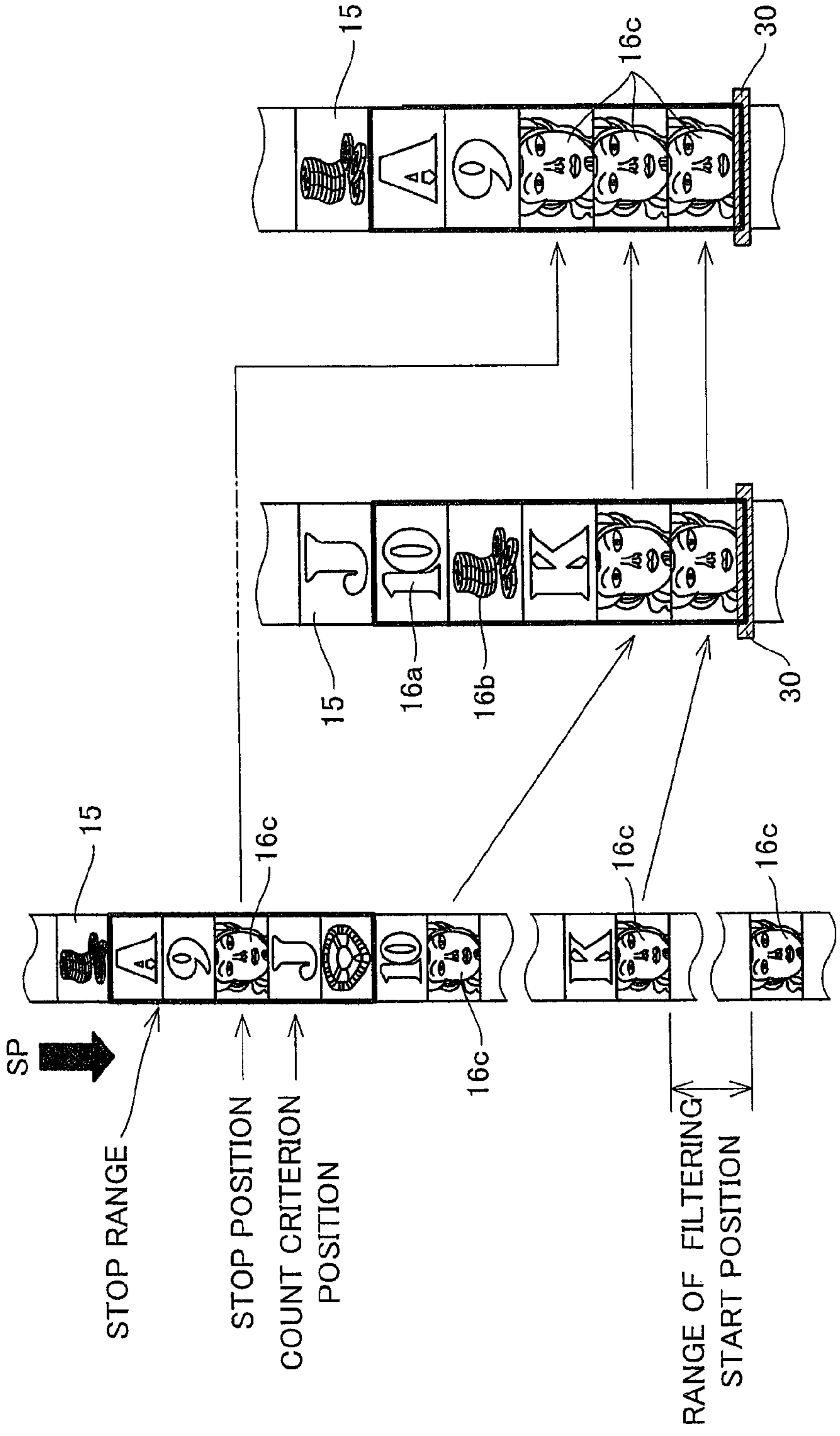
FIG. 20 is a diagram illustrating a correspondence relationship between a cell column to which the filtering spin control according to the second embodiment is applied and symbols on a reel.

In the reel 15 of the developed state of FIG. 20, the heavy line shows a range of the symbols 16 (stop range) to be appeared on the cell column 13, and the position of the symbol 16 at the center of the stop range is referred to as the stop position. Also, it is assumed that the stock number of the wild symbols 16*c* is determined to be "2". A count criterion position is set to the symbol 16 lying on a position that is apart from the lower end of the stop range on the reel 15 by the number of the symbols 16 corresponding to the stock number ("2" in this example) when the reel 15 is traced in a direction opposite to the spin direction (a direction shown by an arrow SP). From the count criterion position, the reel 15 is traced in the spin direction to search the second (corresponds to the stock number) wild symbol 16*c* lying on the position that is apart from the count criterion position. Then, the filtering start position is determined on any position between the second wild symbol 16*c* and the third (adding 1 to 2 of the stock number) wild symbol 16*c* (step S203). If the filtering is started from the position between the second and the third wild symbols 16*c*, two (that is, the stock number) of the wild symbols 16*c* become targets of the filtering, and are stocked on the cell column 13 until the reel 15 stops at the stop position.

Returning to FIG. 19, the explanation will go on. After determining the filtering start position, the control unit 20 goes to step S204, and then makes the reel 15 start spinning. In this case, the spin is started from the position at which the reel 15 previously stopped. After starting the spin, the control unit 20 goes to step S205, and then determine whether or not the spin of the reel 15 advances to the filtering start position. If it does not advance, the control unit 20 repeats the determination in step S205, continuing the spin. On the other hand, if the spin advances to the filtering start position, the control unit 20 goes to step S206. The filter 30 may be displayed after the determination in step S205 becomes affirmative. In step S206, the control unit 20 checks the kind of the symbol 16 reaching a check position of the filter 30 (a filtering position), in other words, the symbol 16 directed to disappear from the cell column 13 next time. This check may be performed to determine whether or not the symbol 16 is the wild symbol 16*c*.

In subsequent step S207, the control unit 20 determines whether or not the result of the check shows the non-passing symbol 16, that is, the wild symbol 16*c*. If it is the wild symbol 16*c*, the control unit 20 goes to step S208, and then prevents the wild symbol 16*c* from passing through the filter 30 to make the wild symbol 16*c* be stocked on the cell column 13. In subsequent step S209, the control unit 20 moves the check position (the filtering position) on the cell column 13 to the cell 12 of one step upward, that is, to a position traced in a direction opposite to a movement direction of the symbols 16 by one cell. The reason is as follows. After the wild symbol 16*c* is stocked on the cell column 13, next, it is necessary to distinguish the kind of symbol 16 on the cell 12 of one step upward from the stocked wild symbol 16*c*. Accordingly, every time the step S207 is affirmative, the check position is changed to the cell 12 of one step upward. However, if the check position lies on the uppermost cell 12, further change is not performed. On the other hand, when it is determined in step S207 as the passing symbol 16, that is, the card symbol 16*a* or the picture symbol 16*b*, the control unit 20 goes to step S210, and then allows the symbol 16 to pass through the filter 30, to thereby make the symbol 16 disappear from cell column 13. Note that if one or more wild symbols 16*c* already remain on the filter 30, the spin of the reel 15 is continued so that the symbols 16 move on the cells 12 other than the cell 12 on which the wild symbol 16 remains. At the position where the wild symbol 16*c* remains, the passing symbols 16 move downward so as to be hidden behind the wild symbol 16.

After processing step S209 or step S210, the control unit 20 goes to step S211, and then determines whether or not the spin of the reel 15 advances to the stop position (refer to FIG. 20). If it does not advance to the stop position, the control 20 returns to step S206, continuing the spin. On the other hand, if it is determined in step S211 that the spin advances to the stop position, the control unit 20 goes to step S212, and then makes the reel 15 stop spinning. Incidentally, during the repetition of the processes from step S206 to step S211, the speed of the spin may gradually be lowered as the stop position comes closer. After stopping the spin in step S212, the control unit 20 terminates the filtering spin control routine of this time, and then returns to an original process (the special game process in FIG. 12). There is a correspondence relationship between original symbols 16 on the reel 15 and symbols 16 that finally appear on the cells 12 of the cell column 13 as indicated by arrows in FIG. 20. In FIG. 20, the wild symbol 16*c* also appears on the central cell 12, but this depends on a matter that the symbol 16 of the stop position merely appears as it is.

Since the filtering spin control routine is executed for the reel 15 of the filtering target column, and if the cell column 13 other than the filtering target column exists, the normal spin control is executed for the reel 15 of that cell column 13, the symbols 16 to be finally appeared on all cells 12 in the symbol display region 11 are determined. After that, the process advances to step S15 of the special game process (FIG. 12), thereby performing the prize winning determination and the payout process in turn. Due to the above, as exemplified in FIG. 16 to FIG. 18, the number of the wild symbols 16*c* in the symbol display region 11 gradually increases, and finally, the possibility of stopping the spin of the reel 15 in the state where a plurality of the wild symbols 16*c* are stacked up on the filtering target column. Thus, the probability of forming the prize winning pattern increases. In the process where the reel 15 starts spinning and thereafter the symbols 16 finally stop, the number of the wild symbol 16*c*, which are stocked in the symbol display region 11, gradually increases. Accordingly, it is possible to raise the player's expectation of obtaining a dividend at one game opportunity. Such function or effect is not limited to a case where two or more game opportunities are continuously given to a player, but can be exerted at one game opportunity.

In the above described embodiment, the control unit 20 serves as a symbol movement control unit by executing step S2 of FIG. 6 or step S14 of FIG. 12, serves as a prize winning determination unit by executing step S3 of FIG. 6 or step S15 of FIG. 12, and serves as a dividend generation unit by executing step S4 of FIG. 6 or step S16 of FIG. 12. Further, the control unit 20 serves as a symbol check unit by executing step S206 of FIG. 19, serves as a specific symbol control unit by executing steps S207, S208, and S210 to S212 of FIG. 19, and serves as a filtering position control unit by executing step S209 of FIG. 19. Furthermore, since the wild symbol 16*c* is prevented from passing through the filter 30 to thereby remain on the cell column 13 and the symbols 16 continuously move on the cells 12 other than the cell 12 on which the wild symbol 16*c* remains, a specific change, which is different from a change to be generated according to an alignment order of the symbols 16, can be introduced with respect to display of the specific symbol in the symbol display region 11.

In the above embodiment, the wild symbol 16*c* is set to serve as the specific symbol. The wild symbol 16*c* is a symbol of the kind that provides a relatively high probability of establishing the prize winning condition. The specific symbol is not limited to the wild symbol 16*c*, and may appropriately be selected from a kind of symbol which provides a relatively high dividend when the prize winning condition is satisfied, or a kind of symbol which provides relatively high probability of satisfying the prize winning condition. For instance, in place of, or in addition to the wild symbol 16*c*, some part of the picture symbols 16*c* may be set as the specific symbol, or only a part of symbols 16 with higher probability of forming the prize winning condition due to great number thereof may be set as the specific symbol. According to such setting of the specific symbol, it is possible to raise possibility of obtaining a high dividend or possibility of forming the prize winning pattern to generate a dividend, thereby raising expectation of a player. Incidentally, in the second embodiment, a symbol which provides a relatively low dividend when the prize winning condition is satisfied, or a symbol which provides relatively low probability of forming the prize winning condition, such as some part of the card symbols 16*a* or a part of symbols 16 with relatively smaller number may be set as the specific symbol, so that management may be performed to consciously lower player's expectation of obtaining a dividend. Procedures of determining the stop position of the reel 15 and the filtering start position in the foregoing embodiment are merely examples, and they may be changed suitably.

In the above embodiment, the filtering position at the time of starting the filtering is set to the lower end of the cell column 13, that is, the end portion of the cell column 13 in the symbol movement direction. However, if, at the time of the start of the filtering, the filtering position, above which a first-appearing specific symbol (the non-passing symbol) remains, is set to a position that is apart from the upper end of the cell column 13 by at least one cell, it is possible to make at least one specific symbol remain in the symbol display region. In order to stock a plurality of the specific symbols in a state that they are continuously arranged in line, the filtering position may be set to a position that is apart from the upper end of the cell column in the movement direction by two or more cells. In the second embodiment, the filtering position is fixed while the passing symbols pass through the filter 30 and is changed upward every time the specific symbol is stocked. However, the filtering position may be moved upward or downward by one or more cells while the passing symbols pass through the filter 30. In this case, the filter 30 (the filter sign) may also be moved downward or upward in synchronization with the movement of the filtering position. The filter 30 may also be displayed when the filtering is not performed. For example, if the filtering is prohibited, at first, the filter 30 may be displayed at an appropriate position on the cell column, and then the filter 30 may be moved upward or downward to be disappeared from the upper or lower end of the cell column.

Third Embodiment

Next, a gaming machine according to the third embodiment of the present invention will be described. The gaming machine is the one in which details of filtering is changed from that of the gaming machine 1 according to the second embodiment. Accordingly, the explanation will be focused on differences from the second embodiment below, and the same reference signs will be given to features that are common to those of the second embodiment (including features common to those of the first embodiment), thereby omitting explanation thereof.

FIG. 21 to FIG. 25 show the game screens 10 in the special game process according to the third embodiment. In the third embodiment, at least two of the three cell columns 13 corresponding to the second reel 15B to the fourth reel 15D are set as cell columns 13 to be targets of filtering (filtering cell columns). In an example of figures, all of three cell columns 13B to 13D are the filtering target columns. Similar to that of the second embodiment, the filtering is a process to control passing or non-passing of the symbols 16 on the basis that the wild symbol 16*c* is set as the non-passing symbol 16 and other symbols 16, that is, the card symbol 16*a* and the picture symbol 16*b* are set as the passing symbol 16. Only one filter 30 is displayed below these filtering target columns. As indicated by arrows A and B, the filter 30 moves in the right and left direction in the game screen 10 so as to prevent the wild symbol 16*c* appearing on each filtering target column from passing through.

Figure 21:
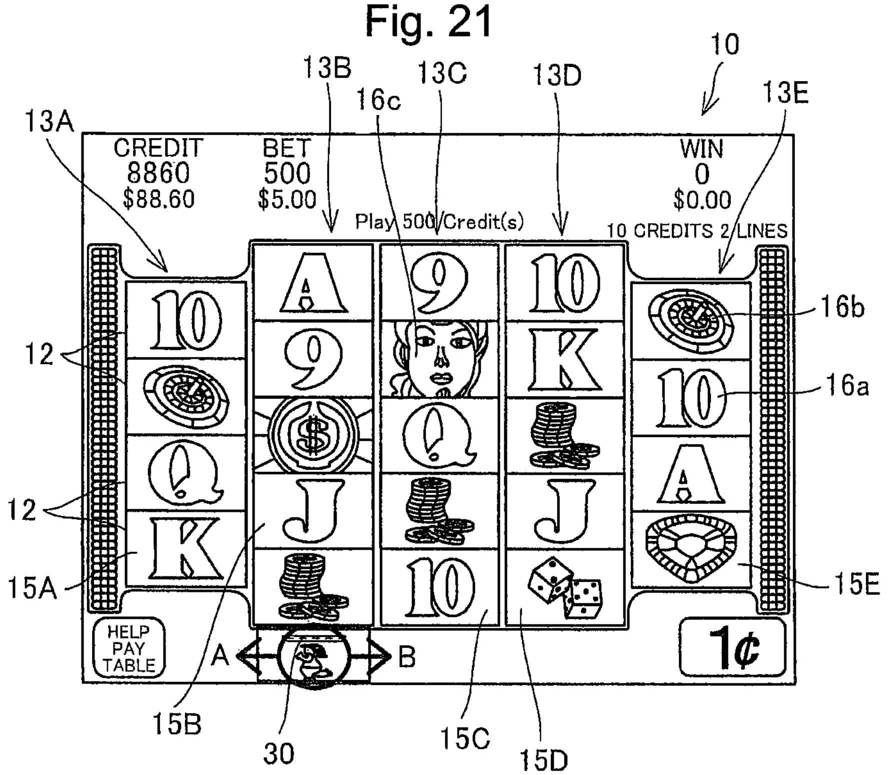
FIG. 21 is a diagram illustrating a game screen when reels begin to spin in the third embodiment.
Figure 22:
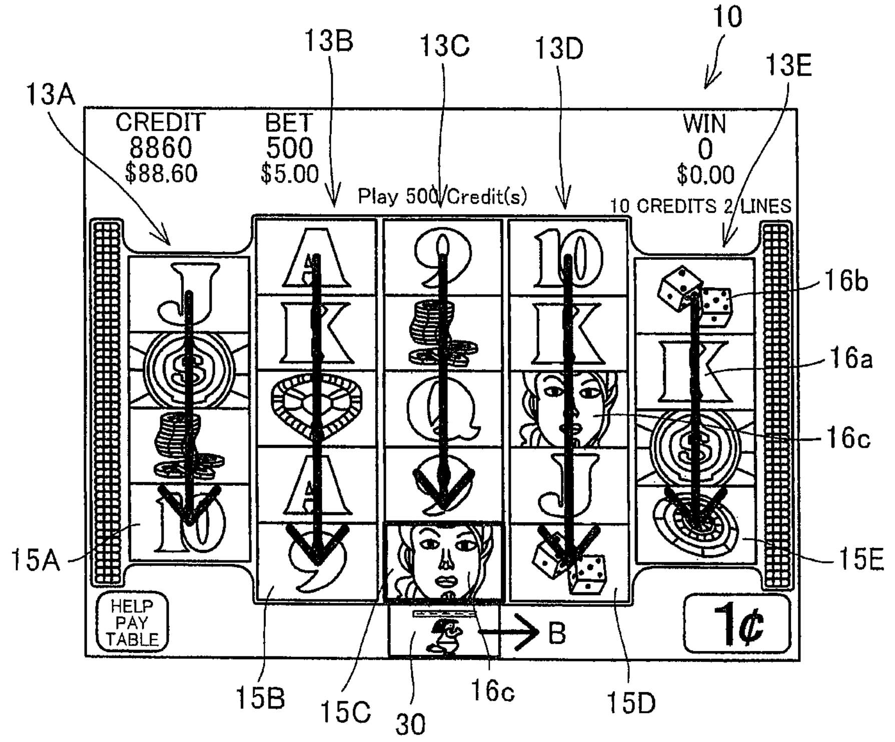
FIG. 22 is a diagram illustrating a game screen following FIG. 21.
Figure 23:
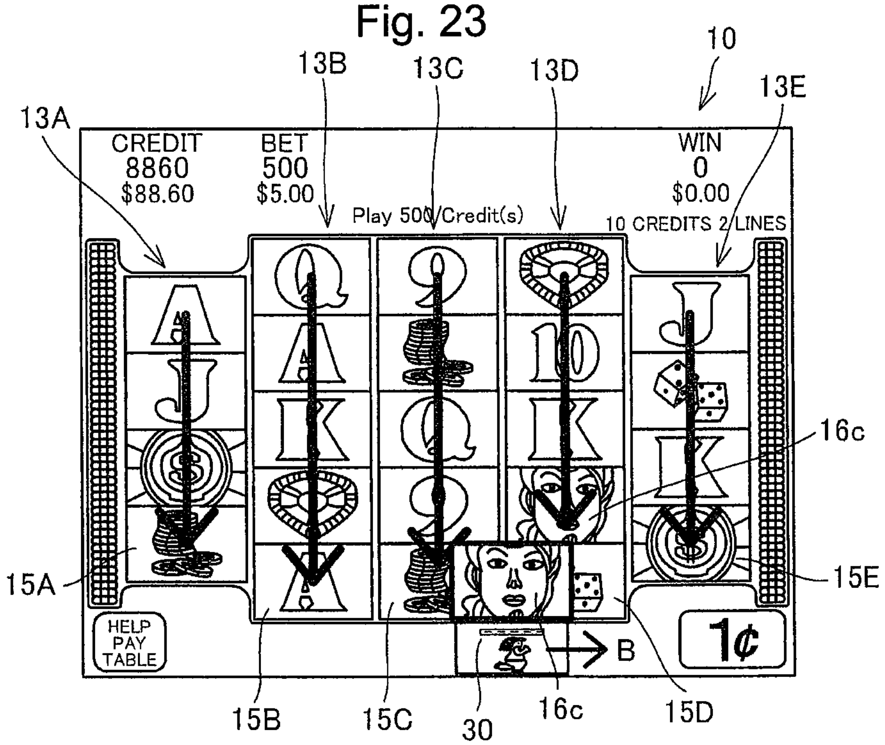
FIG. 23 is a diagram illustrating a game screen following FIG. 22.
Figure 24:
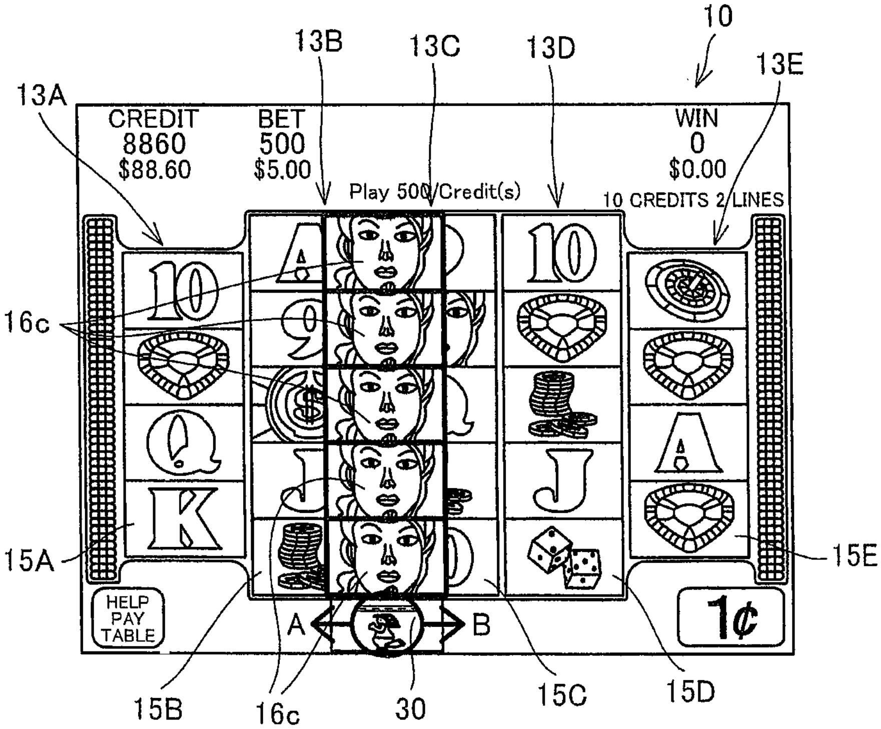
FIG. 24 is a diagram illustrating a game screen following FIG. 23.

For instance, in FIG. 21, the wild symbol 16*c* of the third reel 15C appears on the cell column 13C. Therefore, as shown in FIG. 22, the filter 30 moves to a position below the cell column 13C. In this way, the wild symbol 16*c* of the reel 15C is stocked on the filter 30. Next, the wild symbol 16*c* of the fourth reel 15D appears on the cell column 13D. At this time, the wild symbol 16*c* that has already been stocked on the filter 30 moves integrally with the filter 30. The wild symbol 16*c* appearing on the cell column 13D is newly stocked on a position that is one step up from the wild symbol 16*c* stocked on the filter 30.

Figure 25:
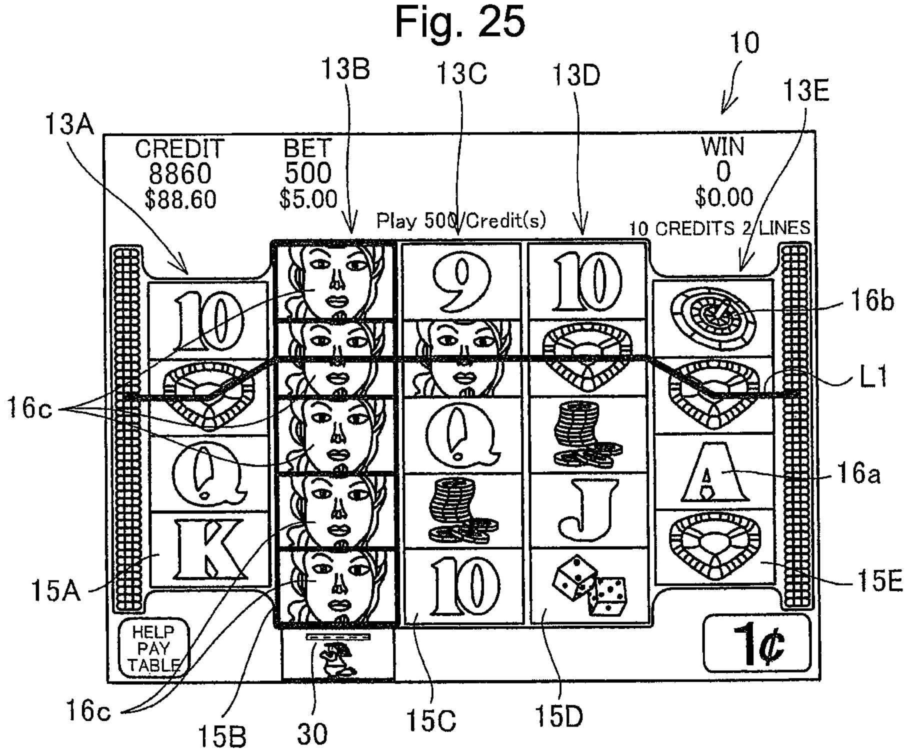
FIG. 25 is a diagram illustrating a game screen following FIG. 24.

In this way, every time the wild symbol 16*c* appears on the filtering target column, the filter 30 move to the filtering target column, and the wild symbols 16*c* are stacked on the filter 30 in turn according to their order of appearing to the filtering target column. After the reels 15B to 15D of the filtering target columns stop spinning, a lottery is performed to draw one filtering target column to which the filter 30 is finally disposed. At the time of the lottery, an animation is displayed is such a manner that the filter 30 with the wild symbols 16*c* moves right and left between the cell columns 13B and 13D. The filter 30 moving between the cell columns 13 finally stops on the filtering target column drawn by the lottery. In FIG. 25, the filter 30 stops on the cell column 13B on which the second reel 15B is disposed. On the filter 30, five of the wild symbols 16*c* have been stocked. However, the stock number is merely an example, and it may be less than 5. The cell column 13 on which the filter 30 finally stops is referred to as a filter stop column. In the filter stop column, the symbol 16 appearing on each cell 12 is replaced by the wild symbol 16*c* stocked on the filter 30. Namely, with respect to the filtering target column that is not drawn as the filter stop column, the symbols 16 on the reel 15 appear on the cells 12 based on the alignment order thereof and the stop position. In this case, the wild symbol 16*c* on the reel 15 may accordingly appear on the cell 12. Since a plurality of the wild symbols 16*c* are stocked on the specific cell column 13 in this manner, the prize winning pattern can easily be formed on the prize winning determination line L1, using these wild symbols 16*c*. Accordingly, it is possible to raise player's expectation in regard to obtaining a dividend.

Figure 26:
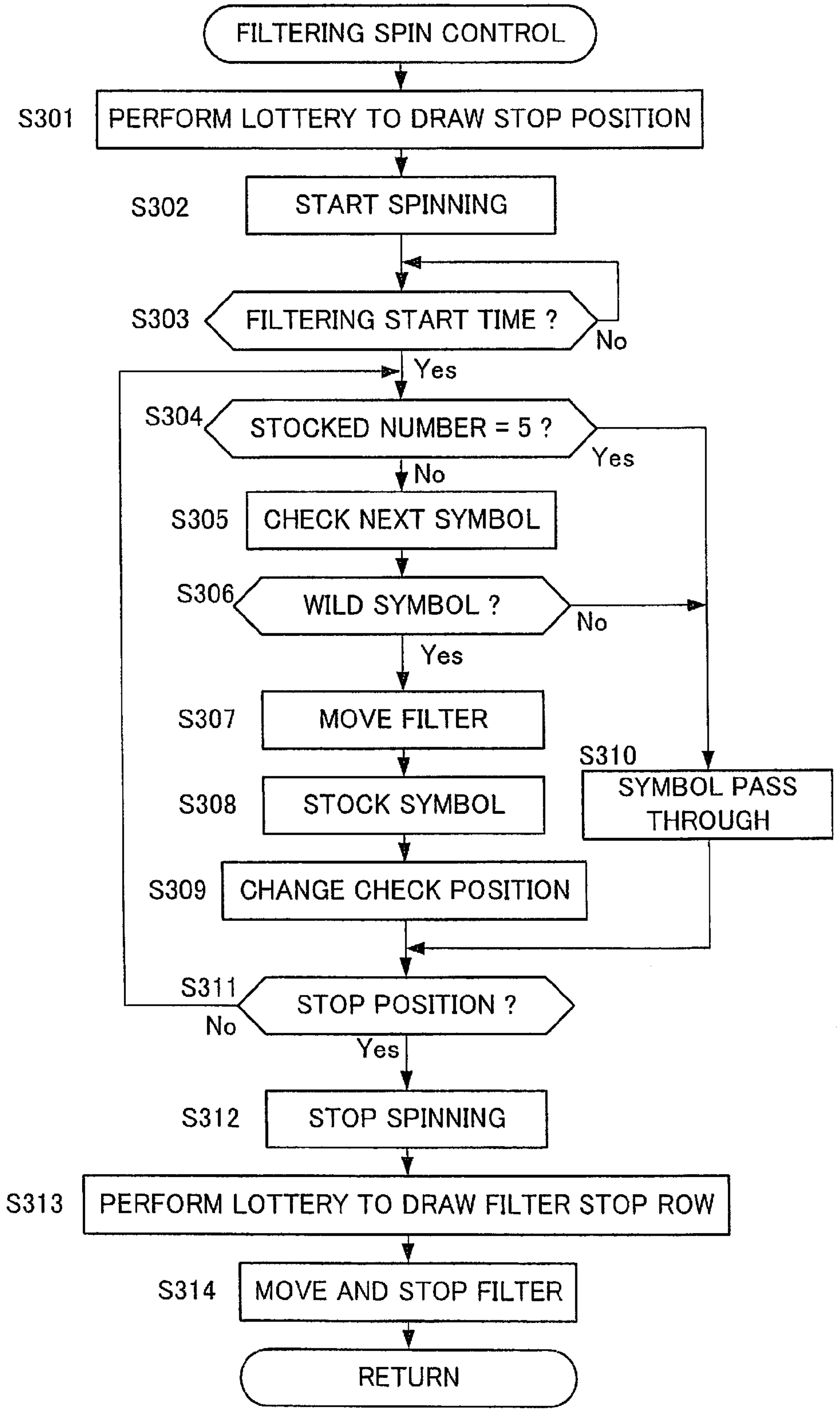
FIG. 26 is a flowchart illustrating a filtering spin control routine according to the third embodiment.

FIG. 26 shows a filtering spin control routine that the control unit 20 executes to implement the filtering exemplified in FIG. 21 to FIG. 25. This routine is executed in place of the filtering spin control routine of the second embodiment (FIG. 19). Note that the routine of FIG. 26 is a process to collectively be executed for all reels 15 corresponding to the cell columns 13 set as the filtering target columns.

When starting the filtering spin control routine of FIG. 26, first in step S301, the control unit 20 performs a lottery to draw stop positions of all reels 15 that are disposed on the filtering target columns. The lottery to draw the stop positions is performed in the same way as that in step S111 of FIG. 13. One example of the stop positions is shown in FIG. 27.

Figure 27:
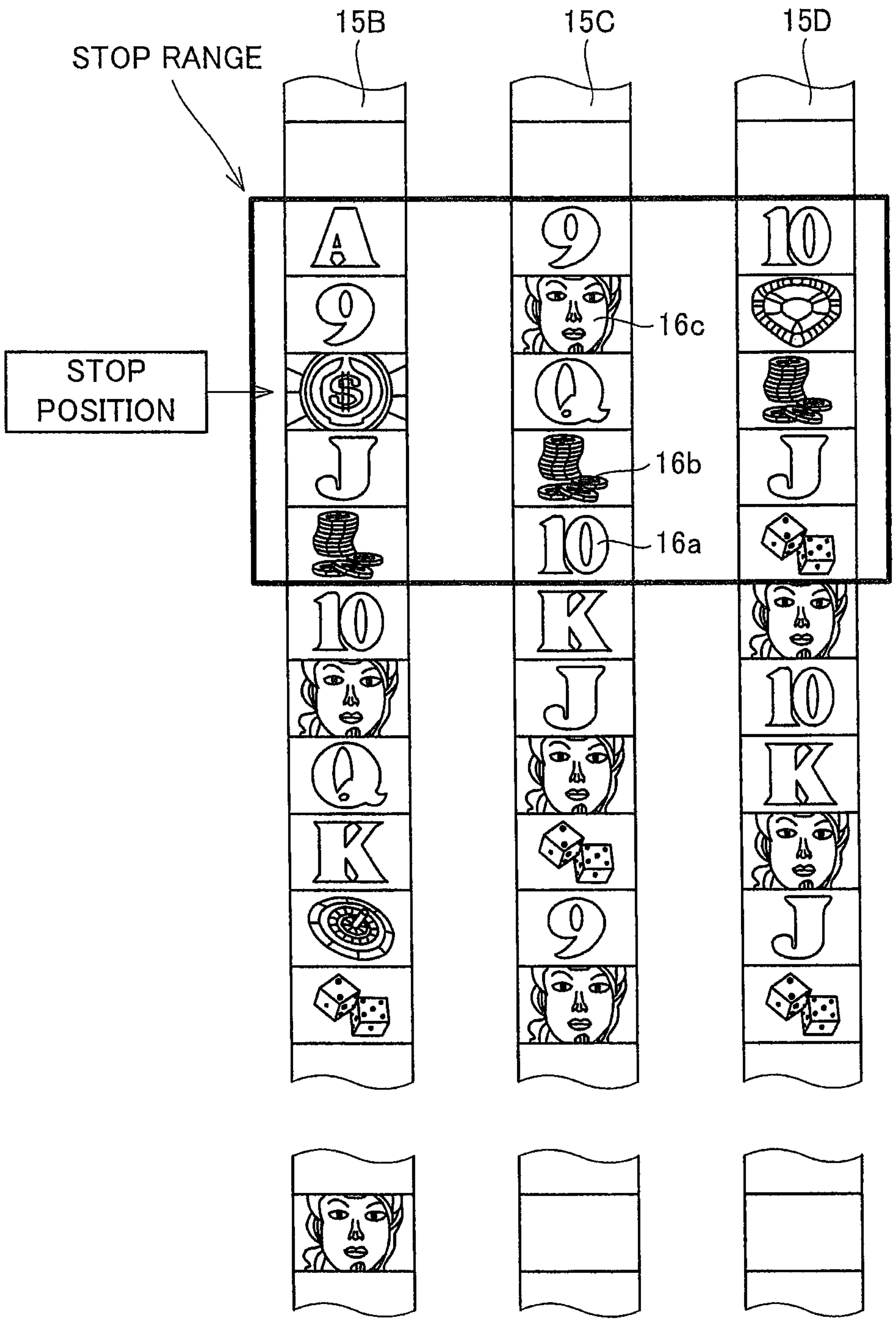
FIG. 27 is a diagram illustrating a correspondence relationship between cell columns to which the filtering spin control according to the third embodiment is applied and symbols on reels.

In FIG. 27, three reels 15 of the filtering target columns are shown in the developed state. In these reels 15, the heavy line shows a range of the symbols 16 (stop range) to be appeared on each cell column 13, and the position of the symbol 16 at the center of the stop range is referred to as the stop position.

Returning to FIG. 26, the explanation will go on. After determining the stop position, the control unit 20 goes to step S302, and then makes the reels 15 start spinning. In this case, the spin is started from the position at which the reel 15 is previously stopped. In subsequent step S303, the control unit 20 determines whether or not the start time of the filtering comes. The start time of the filtering may be set to the same time as the start time of the spin, or may be set to a late time from the start time of the spin. Namely, the start time of the filtering may be set to an appropriate time during the spin. If the filtering start time does not come, the control unit 20 repeats the determination of step S303, continuing the spin. On the other hand, if the filtering start time comes in step S303, the control unit 20 goes to step S304. The filter 30 may be displayed after the determination in step S304 becomes affirmative. In step S304, the control unit 20 determines whether or not the number (stock number) of the wild symbols 16*c* that is stocked on the filter 30 has reached 5. If it does not reach 5, the control unit 20 goes to step S305, and then checks the kind of the symbol 16 reaching a check position of the filter 30 (a filtering position), in other words, the symbol 16 directed to disappear from the cell column 13 next time. This check may be performed to determine whether or not the symbol 16 is the wild symbol 16*c*. However, the check is performed for all of the filtering target columns.

In subsequent step S306, the control unit 20 determines whether or not the result of the check shows the non-passing symbol 16, that is, the wild symbol 16*c*. This determination can be affirmative if the wild symbol 16*c* exists on any one of the filtering target columns. Thereafter, if the wild symbol 16*c* exists, the control unit 20 goes to step S307, and then move the filter 30 and the wild symbol 16*c* stocked thereon to the filtering target column on which the wild symbol 16*c* exists. In subsequent step S308, the control unit 20 prevents the wild symbol 16*c* intended to disappear from the filtering target column from passing through the filter 30 and makes the wild symbol 16*c* be stocked on the filter 30 or the wild symbol 16*c* that has already been stocked. In next step S309, the control unit 20 shifts the check position (filtering position) on the cell column 13 to the cell 12 of one step up. Namely, if one wild symbol 16*c* is stocked on the cell column 13, then the kind of the symbol 16 needs to be distinguished at the cell 12 of one step up from this wild symbol 16*c*. Therefore, the check position is shifted to one step upper cell 12 every time the affirmative determination is made in step S306.

On the other hand, if the determination in step S306 is negative, that is, if the next symbols 16 are determined as the passing symbols 16 (the card symbol 16*a* or the picture symbol 16*b*) on all of the filtering target columns, the control unit 20 goes to step S310, and then allows the symbol 16 to pass through the filter 30 to thereby make the symbol 16 disappear from the cell column 13. If it is determined that the stock number reaches 5 in step S304, the control unit 20 goes to step S310 without performing the process in step S309. While the wild symbol 16*c* exceeding the number of 5 cannot be stocked, the wild symbol 16*c* can finally appear on the cell 12 below the check position of the filter 30 on the filtering target column other than the filter stop column. Therefore, when the determination in step S304 is affirmative, the stock of the wild symbol 16*c* is prohibited in the future.

After processing step S309 or step S310, the control unit 20 goes to step S311, and then determine whether or not the spin of each reel 15 advances to the stop position (refer to FIG. 27). If it does not advance to the stop position, the control 20 returns to step S304, continuing the spin. On the other hand, if it is determined in step S311 that the spin advances to the stop position, the control unit 20 goes to step S312, and then makes the reel 15 stop spinning. Incidentally, during the repetition of the processes from step S304 to step S311, the speed of the spin may gradually be lowered as the stop position comes closer.

After stopping the spin in step S312, the control unit 20 goes to step S313, and then performs the lottery to draw the filter stop column. The lottery may be performed using random numbers and the like. After that, the control unit 20 goes to step S314, moves the filter 30 and the wild symbols 16*c* stocked thereon to the drawn filter stop column, and stops them. After finishing the process in step S314, the control unit 20 terminates the filtering spin control routine of this time, and then returns to an original process (the special game process in FIG. 12).

Since the filtering spin control routine is executed for the reel 15 of the filtering target column, and the normal spin control is executed for other reels 15, the symbols 16 to be finally appeared on all cells 12 in the symbol display region 11 are determined. After that, the process advances to step S15 of the special game process, thereby performing the prize winning determination and the payout process in turn. Due to the above, as exemplified in FIG. 21 to FIG. 25, the number of the wild symbols 16*c* stocked on the filter 30 gradually increases, and finally, the spins of the reels 15 stop in the state that a plurality of the wild symbols 16*c* are stacked on any one of the filtering target columns. In this way, the probability of forming the prize winning pattern increases. In the process where the reel 15 starts spinning and thereafter the symbols 16 finally stop, the number of the wild symbol 16*c*, which are stocked in the symbol display region 11, gradually increases. Accordingly, it is possible to raise the player's expectation of obtaining a dividend at one game opportunity. Such function or effect is not limited to a case where two or more game opportunities are continuously given to a player, but can be exerted at one game opportunity.

In the above described embodiment, the control unit 20 serves as a symbol movement control unit by executing step S2 of FIG. 6 or step S14 of FIG. 12, serves as a prize winning determination unit by executing step S3 of FIG. 6 or step S15 of FIG. 12, and serves as a dividend generation unit by executing step S4 of FIG. 6 or step S16 of FIG. 12. Further, the control unit 20 serves as a symbol check unit by executing step S305 of FIG. 26, serves as a specific symbol control unit by executing steps S306 to S308, and S310 to S314 of FIG. 26, and serves as a filtering position control unit by executing steps S307 and S309 of FIG. 26. Furthermore, since the wild symbol 16*c* is prevented from passing through the filter 30 to thereby remain on the cell column 13, the symbols 16 continuously move on the cells 12 other than the cell 12 on which the wild symbol 16*c* remains, and the stocked wild symbols 16*c* move to and stop on any one of the cell columns 13, a specific change, which is different from a change to be generated according to an alignment order of the symbols 16, can be introduced with respect to display of the specific symbol in the symbol display region 11.

In the above embodiment, the wild symbol 16*c* is set to serve as the specific symbol, however, the choice thereof can be modified similar to that of the second embodiment. As mentioned in the second embodiment, the filtering position at the time of starting the filtering spin may be set to a position that is apart from the upper end of the cell column in the movement direction by two or more cells. With respect to the movement of the filter 30 according to the third embodiment, it can be controlled so as to stock all of the non-passing symbols 16 (the wild symbols 16*c*) appearing on all of the filtering target columns. However, the movement of the filter 30 may be controlled in such a manner that the filter 30 fails to stock some of the non-passing symbols 16 appearing on the filtering target columns. For example, the movement of the filter 30 can be controlled so as to move randomly in the right and left direction, or to reciprocate in the right and left direction at a predetermined speed (e.g. constant speed), thereby the filter 30 sometimes failing to stock the non-passing symbol. Further, the filter 30 may be controlled to follow the non-passing symbols 16, but the filter 30 sometimes fails to catch the non-passing symbol 16 due to a lower speed thereof.

The present invention is not limited to the first to the third embodiments, and can be deformed or changed. For instance, the present invention is not limited to a gaming machine in which the symbol moves on the cell column from the top to the bottom thereof, and can be applied to a gaming machine in which the symbol moves from the bottom to the top, or moves in the right and left direction. If the specific symbol needs to be prevented from appearing on the symbol display region as in the case of the first embodiment, the filtering position may be set to an end portion of the cell column opposite to the symbol movement direction. If the specific symbol needs to remain in the symbol display region, the filtering position may be set to a position apart from an end portion of the cell column on a side where the symbol appears, by at least one cell in the symbol column movement direction. Further, if a plurality of the specific symbols need to remain in a state that they are continuously disposed in the cell column direction, the filtering position may be set to a position apart from an end portion of the cell column on a side where the symbol appears, by at least two cells in the symbol column movement direction, and when the specific symbol remains, the filtering position may be renewed to a position which is traced back by one cell toward the opposite side to the symbol column movement direction. The filter sign is not limited to the illustrated shape, and the filter sign may be represented by various figures, letters and marks, such as characters and the like.

The present invention is not limited to an example in which the specific change can be generated over the entire period from the starting time of the symbol column movement to the stopping time thereof. Modification can be done in respect to the specific change. For example, the determination of the specific symbol at the filtering position and the specific change associated with the determination may be started or suspended, if a predetermined condition is satisfied on the halfway after the symbol column starts moving in exchange of providing one game opportunity. Namely, the time period, in which the determination of the symbol at the filtering position and the specific change are performed, may accord with the entire period of the reel spin, or may be limited to a partial time range in the entire period of the spin.

The specific change in respect to the specific symbol is not limited to the above embodiments. For instance, in the first embodiment, the specific symbol reaching the filtering position may change to a symbol other than the specific symbol to thereby be appeared in the symbol display region. In the second or the third embodiment, the specific symbol reaching the filtering position may be changed to a symbol other than the specific symbol to thereby remain on the cell column. The position and the number of the cell column where the specific change generates are statically set in advance, or are appropriately changed in accordance with the game opportunity through measures such as lotteries and the like. The configuration of the reel is not limited to the type where one symbol stops and appears on one cell. The reel may be configured in such a manner that two or more symbols stop and appear on one cell. In this case, when one of the symbols appearing on the same cell is the non-passing symbol, the filtering process can be applied such that these symbols are integrally replaced by a blank, or these symbols integrally remain on the filter.

The gaming machine according to the present invention is not limited to a gaming machine of so-called stand alone type in which all of elements are accommodated in a unitary cabinet, and the scope of the present invention also includes a gaming machine of a network type where a server unit and a terminal unit are connected with each other through a network and cooperate with each other to execute a game.

The invention claimed is:

1. A gaming system comprising:

a display device;

a memory device that stores reel data defining a plurality of reels, each reel having a set of symbols including a specific symbol and a non-specific symbol; and a game controller that is configured to indicate a portion of the reels arranged adjacent each other in a predetermined region of the display device, spin the reels for initiating a game, and stop the reels for indicating a result of the game, wherein as a reel spins, every symbol on said reel moves in a vertical direction in the predetermined region, and when a predetermined condition is satisfied, while the reel is spinning, the game controller eliminates the specific symbol that reaches an end portion of the reel in the predetermined region.

2. The gaming system according to claim 1, wherein said reel moves from an upper end to a lower end in the predetermined region of the display, and the end portion is set to be the upper end of the reel.

3. The gaming system according to claim 1, wherein the game controller replaces the eliminated specific symbol with a blank that enters the predetermined region of the display device.

4. The gaming system according to claim 3, wherein the blank entered in the predetermined region is supplemented by a non-specific symbol.

5. The gaming system according to claim 1, wherein the game controller indicates at least one reel outside of the predetermined region of the display device.

6. The gaming system according to claim 1, wherein the specific symbol is set to provide a relatively low dividend when a prize winning condition is established.

7. The gaming system according to claim 1, wherein the specific symbol is set to provide a relatively low probability of forming a prize winning condition.

8. A gaming system comprising:

a display device;

a memory device that stores reel data defining a plurality of reels, each reel having a set of symbols including a specific symbol and a non-specific symbol; and a game controller that is configured to indicate a portion of the reels arranged adjacent each other in a predetermined region of the display device, spin the reels for initiating a game, and stop the reels for indicating a result of the game, wherein as a reel spins, every symbol on said reel moves in a vertical direction in the predetermined region, and when a predetermined condition is satisfied, while the reel is spinning, the game controller holds the specific symbol that reaches an end portion of the reel in such a manner that the specific symbol remains in the predetermined region while the non-specific symbol exits from the predetermined region.

9. The gaming system according to claim 8, wherein said reel moves from an upper end to a lower end in the predetermined region of the display, and the end portion is set to be the lower end of the reel.

10. The gaming system according to claim 8, wherein the end portion is set to be apart from the upper end of the reel in the predetermined region by two or more symbols.

11. The gaming system according to claim 8, wherein the specific symbol is stacked in the predetermined region so as to be piled above the specific symbol that has been held.

12. The gaming system according to claim 11, wherein two or more specific symbols are stacked in the predetermined region, and the game controller determines a number of the specific symbols to be stacked in the predetermined region.

13. The gaming system according to claim 12, wherein the game controller gradually increases the number of the specific symbols stacked in the predetermined region while the reel is spinning.

14. The gaming system according to claim 11, wherein the specific symbol stacked in the predetermined region is visible to a player, while the non-specific symbol that moves behind the stacked specific symbol is not visible to the player.

15. The gaming system according to claim 8, wherein the game controller indicates at least one reel outside of the predetermined region of the display device.

16. The gaming system according to claim 8, wherein the specific symbol is set to provide a relatively high dividend when a prize winning condition is established.

17. The gaming system according to claim 8, wherein the specific symbol is set to provide a relatively high probability of forming a prize winning condition.

* * * * *